US012705224B2

(12) United States Patent
Lakkundi et al.

(10) Patent No.: US 12,705,224 B2
(45) Date of Patent: Aug. 11, 2026

(54) METHODS, SYSTEMS, AND COMPUTER PROGRAM PRODUCTS FOR IMPLEMENTING METADATA MANAGEMENT

(71) Applicant: Oracle International Corporation, Redwood Shores, CA (US)

(72) Inventors: Vijayendra Lakkundi, Hyderabad (IN); Nagarajan Muthukrishnan, Redwood Shores, CA (US); Ravi Thammaiah, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/893,860

(22) Filed: Sep. 23, 2024

(65) Prior Publication Data

US 2026/0086993 A1 Mar. 26, 2026

(51) Int. Cl.
*G06F 16/22* (2019.01)
*G06F 16/23* (2019.01)

(52) U.S. Cl.
CPC ...... *G06F 16/2246* (2019.01); *G06F 16/2379* (2019.01)

(58) Field of Classification Search
CPC ......................... G06F 16/2246; G06F 16/2379
See application file for complete search history.

(56) References Cited

U.S. PATENT DOCUMENTS

| | | | | |
|---|---|---|---|---|
| 10,417,611 | B2 * | 9/2019 | Collins | G06F 16/2228 |
| 10,650,011 | B2 * | 5/2020 | Barber | G06F 16/2465 |
| 2016/0063049 | A1 * | 3/2016 | Vijayasekaran | G06F 16/2365 707/694 |
| 2018/0373729 | A1 * | 12/2018 | Mathurin | G06F 16/1844 |
| 2021/0390095 | A1 * | 12/2021 | Muralidhar | G06F 3/0605 |
| 2022/0129435 | A1 * | 4/2022 | Jaunk | G06F 16/248 |
| 2022/0245032 | A1 * | 8/2022 | Singh | G06F 16/275 |
| 2023/0385248 | A1 * | 11/2023 | Izenson | G06F 16/212 |
| 2025/0103587 | A1 * | 3/2025 | Lee | G06F 16/1865 |

OTHER PUBLICATIONS

Liu, H., "CFS: A Distributed File System for Large Scale Container Platforms," Association for Computing Machinery, dated Jun. 2019.
"Oracle Data Safe Technical Architecture," Oracle, Copyright 2019.
(Continued)

*Primary Examiner* — Huawen A Peng
(74) *Attorney, Agent, or Firm* — Vista IP Law Group, LLP

(57) ABSTRACT

Disclosed is an improved approach to manage hierarchical metadata for a database system. A hierarchical metadata structure pertaining to a hierarchical object structure of a multitenant database architecture for a plurality of tenants may be maintained where the multitenant database architecture comprising a container database (CDB) that includes a pluggable database (PDB). A request for an access to a metadata object in the hierarchical metadata structure for one or more database objects in the container database may be received. In response to the request for the access to the metadata, access to at least a portion of the hierarchical metadata structure is provisioned.

30 Claims, 28 Drawing Sheets

(56) References Cited

OTHER PUBLICATIONS

Oehrli, S., "Oracle 23c DB Nest in practical use," dated Oct. 2023.
"IBM Storage Fusion HCI," Product Review, The Futurum Group Research, dated Dec. 26, 2023.
"Security Concepts in Oracle Multitenant," Oracle White Paper, dated Jan. 2015.
"Oracle Multitenant with Oracle Database19c," Oracle White Paper, dated Mar. 2019.
Cusack, M., et al., "Yellowbrick: An Elastic Data Warehouse on Kubernetes," Yellowbrick Data, 14th Annual Conference on Innovative Data Systems Research (CIDR '24), dated Jan. 2024.
Quintero, D., et al., Red Hat OpenShift V4.X and IBM Cloud Pak on IBM Power Systems vol. 2, RedBooks, IBM, dated Apr. 2021.
Lee, J., et al., "SAP HANA Distributed In-Memory Database System: Transaction, Session, and Metadata Management," 2013 IEEE 29th International Conference on Data Engineering (ICDE). Brisbane, dated Apr. 2013.
Russom, P., "Data Lakes Purposes, Practices, Patterns, and Platforms," Q Research, dated 2017.
Sofia, R., et al., "A Framework for Cognitive, Decentralized Container Orchestration," Digital Object Identifier 10.1109/ACCESS.2024.3406861, dated Jun. 2024.
PCT International Search Report and Written Opinion for International Appln. No. PCT/US2025/047555, Applicant Oracle International Corporation, dated Dec. 5, 2025.
Aulbach, S,. "Schema Flexibility and Data Sharing in Multi-Tenant Databases", dated Oct. 20, 2016 (Oct. 20, 2016), XP055768308, Retrieved from the Internet: URL: http://web.archive.org/web/20161020162134if_/http://mediatum.ub.tum.de:80/doc/1075044/document.pdf.

* cited by examiner

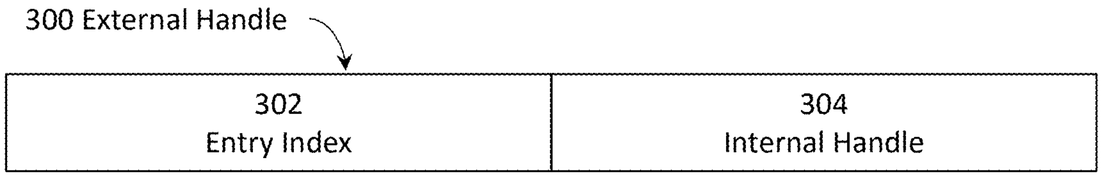

306 Internal Handle

| 314 | 308 Type | 310 Generation Count | 312 Slot Index |
|---|---|---|---|

316
Object Entry Structure

Dbnest_obj_ent_t

```
/* Entry object - sequentially indexed in entry table */
struct dbnest_obj_ent_t
{
  dbnest_obj_ihdl_t     ihdl_dbnest_obj_ent_t;
};
typedef struct dbnest_obj_ent_t dbnest_obj_ent_t;
```

318
Object Buffer Structure

Dbnest_obj_buf_t

```
/* Buffer object. */
struct dbnest_obj_buf_t
{
  int     lock_dbnest_obj_buf_t;
  int     used_dbnest_obj_buf_t;
  int     type_dbnest_obj_buf_t;
  ub1
buf_dbnest_obj_buf_t[DBNEST_OBJ_SIZE_MAX];
  size_t  bufl_dbnest_obj_buf_t;
};
typedef struct dbnest_obj_buf_t dbnest_obj_buf_t;
```

FIG. 3A

328 Buffer Array

| 330<br>Buffer Obj1 | 332<br>Buffer Obj2 | ... | 334<br>DBNEST_OBJ_COUNT_MAX |
|---|---|---|---|

| 336<br>MAX |
|---|
| #define DBNEST_OBJ_SIND_LEN (13) /* slot index - 8k objects */<br>...<br>...<br>#define DBNEST_OBJ_COUNT_MAX (1 << DBNEST_OBJ_SIND_LEN)<br>#define DBNEST_OBJ_SIZE_MAX (16384) /* 16k sized buffers */ |

FIG. 7C

METHODS, SYSTEMS, AND COMPUTER PROGRAM PRODUCTS FOR IMPLEMENTING METADATA MANAGEMENT

BACKGROUND

A database is an organized collection of structured information, or data, typically stored electronically in a computer system. A database is usually controlled by a database management system (DBMS), which is the management infrastructure that is used to control and operate upon the database. Data as well as metadata for such data within the most common types of databases in operation today is typically modeled in rows and columns in a series of tables to make processing and data querying efficient. The data can then be easily accessed, managed, modified, updated, controlled, and organized. Most databases use structured query language (SQL) for writing and querying data.

Various types of logs are normally maintained within database systems. For example, a "redo log" is maintained in many database systems to hold redo records that allow persistence and restoration of activities within a database system for transactional activities. An "undo log" may include records that are used to roll back changes for uncommitted transactions. Both are employed to ensure atomicity and durability of transactions in the database.

In autonomous cloud environments, hundreds or thousands of tenant databases can be consolidated together as pluggable databases in isolated container databases hosted in compute appliances. These multi-tenant environments host execution environments for thousands of clients within the consolidated databases. Providing secure access to the tenant database entities in a hierarchical manner and at the same time isolating and preventing them in accessing higher level privileged resources is a vital requirement for the cloud management frameworks including consolidated databases and cloud appliances.

Some databases support providing isolated and hierarchical runtime requirements for the tenant databases through novel features such as database nests. These containers have their own execution problem in securely managing their own meta data across the hierarchical tenant entities. For example, the low level tenant execution entity should have access to its own container meta data and at the same time should not have access to the higher level execution entities.

When a muti-tenant database creates hierarchical container runtimes environments (aka database nests) for pluggable databases and/or container databases, the meta data management of these nests becomes a challenge. Therefore, there is a need for an improved approach to implement database metadata management.

SUMMARY

Various embodiments are directed to an approach for implementing database metadata management. These embodiments provide, through implementations of metadata management, a secure database environment in which given that competing cloud tenants may rent out the tenant database entities and/or container databases corresponding to these runtime entities, the requirement of metadata information security of the objects is fulfilled. For example, unintended information exposure and/or unauthorized information access may be prohibited by default configuration (e.g., with no additional steps/setup required) and by design. (e.g., not as an afterthought after setup/implementation).

Runtime entities are often hierarchical in nature (e.g., in a parent-child relationship), some embodiments manage metadata objects arranged in a hierarchical structure where a parent object or a higher-hierarchy object may access objects at lower level(s) (e.g., child level(s), grandchild level(s), etc.) whereas a lower-level object is not allowed to access a higher-level object.

Some embodiments implement metadata management in a manner that is dynamically scalable at runtime. For example, a container database may include thousands of pluggable databases. Depending upon the configuration, the number of pluggable databases may vary dynamically at runtime. The metadata object manager described herein also scales accordingly (e.g., increase/decrease with the dynamic increase/decrease of runtime entities managed by the metadata object manager).

Moreover, a read or write operation of metadata from/to a metadata object store may need to be consistent and atomic in nature in some embodiments. In these embodiments, partial and/or fractured read or write operations may be prohibited by the metadata object manager described herein, even during concurrent and high-volume database operations. In some embodiments, a metadata object manager described herein has a robust design where there is no single point of failure. For example, a single manager process or a communication conduit may become single a point of failures—if one or more of them get killed or are deleted from the system.

A metadata object manager described herein may encrypt metadata by default in some embodiments, and thereby rendering the unauthorized access futile without a decryption key to add further security to metadata objects in the metadata object store. In some embodiments, a metadata manager described herein may provide any of the aforementioned features or characteristics using underlying primitives. For example. the underlying operating system or OS (Linux, for example) may utilize several low-level primitives (e.g., shared memory primitives and or file system isolation-based primitives, etc.) to provide the aforementioned characteristics or features of the metadata management system.

A database architecture may have a container database (CDB) which may hold one or more pluggable databases (PDB) which may be plugged in and out of a container database (CDB) and will always "belong" to one and only one container database. There may exist a parent-child relationship between a container database and pluggable databases. A database may also have the ability to create isolated, hierarchical runtime entities for each of the container database and pluggable database(s). These entities may be referred to as nest objects. The metadata of these nest objects may need to be stored in a manner to provide one or more of the aforementioned features or characteristics described herein. At a hierarchy level, there may be multiple nest objects grouped together based on the isolation level in the hierarchy.

Some embodiments provide a higher-level isolation by grouping metadata objects at the same level and isolate these grouped metadata objects from objects at lower hierarchy levels by using, for example, low-level primitives such as file system isolation. For example, some embodiments achieve mount space duplication via mount namespaces (e.g., in Linux) and later achieve file system isolation so that a parent nest's metadata objects may be hidden from the child for the security of the metadata object store. A nest object may load the metadata object manager and obtain access to the metadata for its own load or store. The hierarchy is enforced where a parent may be allowed to access child nest metadata objects, but a child is prohibited from accessing a parent nest metadata object. In some embodiments, the aforementioned enforcement of hierarchies may be implemented via mount namespaces and file system isolation (e.g., metadata object store is implemented as files which are mapped() in the operating system by the nests. In some of these embodiments, all the data writes may be encrypted by default and only valid nest objects may be given access to the decryption key to add another layer of security to the metadata store.

An access (e.g., read or write) operation on a metadata object may be implemented as follows in some embodiments. With an object's entry index provided by a client, an entry object structure that encapsulates an internal handle pertaining to a metadata object to be accessed may be accessed. With the object's entry index from, for example, an external handle from a client, an internal handle may be retrieved from the aforementioned entry object structure. A slot index may be extracted from the retrieved internal handle and may then be used to identify the buffer object that holds the metadata at that particular slot index. For a write operation, these embodiments may either modify an existing, occupied slot or identify an empty slot in the aforementioned entry object structure, populate the fields of the existing, occupied slot (or the empty slot) with updated data passed from the requester (e.g., a client requesting to perform the write operation) and atomically switch the internal handle pointer that points to the new internal handle for the particular metadata object.

One or more data structures (e.g., the entry object structure, a buffer array, etc.) may be protected using one or more low-level operating system (OS) primitives such as Compare And Swap (CAS)-based or namespace-based processor instructions that may atomically change a location of an entry in a data structure (e.g., atomically changing the location of an entry in the entry object structure). A metadata object store may be configured to store up to a maximum number of objects as defined by the specific implementation, various techniques described herein dynamically scale well with an increasing or decreasing number of objects (e.g., metadata objects). Moreover, a read operation or a write operation may always be performed in full (e.g., fractured read, fractured write, etc. may be precluded). Moreover, if a client is terminated during a write operation, the implementation (e.g., CAS-based or namespace-based implementation) and the design (e.g., copying over the contents to a new entity object, etc.) of various embodiments ensure that the entire data is written and hence guarantees consistency of read and write operations. Furthermore, there is no master-slave process or manager process that can potentially become single point of failures to the object management system or server in various embodiments. Therefore, the possibility of single points of failure is eliminated or at least greatly reduced to satisfy the robustness criterion. Some embodiments may require all read and write operations proceed through a set of encryption and decryption functions to add further security.

Some embodiments are directed to a method for managing metadata in a multitenant environment. In these embodiments, a hierarchical metadata structure pertaining to a hierarchical object structure of a multitenant database architecture for a plurality of tenants, the multitenant database architecture comprising a container database (CDB) that includes one or more pluggable databases (PDBs) may be maintained. A request for an access to a metadata object in the hierarchical metadata structure for one or more database objects in the container database may be received. In response to the request for the access to the metadata, a lock-free access to at least a portion of the hierarchical metadata structure may be provisioned.

In some of these embodiments, the hierarchical metadata structure stores therein an object entry structure, the object entry structure storing therein one or more external handles, the one or more external handles respectively corresponding to one or more objects in the hierarchical metadata structure. In some of the immediately preceding embodiments, an external handle of the one or more external handles corresponds to the metadata object in the hierarchical metadata structure and encodes an index and an internal handle that both correspond to the metadata object.

In some of these embodiments, wherein the internal handle encodes therein at least one of a slot index value pertaining to the metadata object, a sequence count value pertaining to a number of modifications to one or more metadata objects in the hierarchical metadata structure, or an access type value pertaining to accessibility of the external handle that corresponds to the metadata object.

In some embodiments, the hierarchical metadata structure stores therein an object buffer structure or array, the object buffer array storing therein the metadata object to which the access is requested or a link to a location at which the metadata object is to be accessed and at least one of a buffer slot index value or an object entry index that corresponds to an external handle pertaining to the metadata object. The terms object entry index and entry index may be used interchangeably throughout the present disclosure.

In addition or in the alternative, in response to the request for the access from a tenant, information of a client handle may be checked against corresponding information of an external handle to determine whether the client handle is still valid at a first time when the request is received. Upon a first determination that the client handle is still valid at the first time, the request for the access may be granted to the tenant to service the request at least by providing a pointer to the metadata object to fulfill the request.

In some of these embodiments, information of the client handle may be checked against corresponding information of the external handle to determine whether the client handle is still valid at a second time when servicing the request is completed; and upon a second determination that the client handle is still valid at the second time, one or more changes in the metadata object resulting from the access may be committed, wherein the access includes a write operation to the metadata object.

In some of the immediately preceding embodiments, one or more changes in the metadata object are committed using an atomic operation, and the atomic operation comprises storing at least the one or more changes in a persistent storage, updating a sequence count value pertaining to a total number of modifications to metadata objects in the hierarchical metadata structure, and updating an access type from a first access type value to a second access type value.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in a computing system located in a local computing environment in some embodiments or in a cloud environment in some other embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed to a computer program product having a non-transitory computer usable medium that stores a sequence of instructions which, when executed by a processor, causes the processor to perform any of the methods, processes, or sub-processes disclosed herein. Some exemplary forms of the non-transitory machine-readable storage media may also be found in the System Architecture Overview section below.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWING FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 3A-3B illustrate some simplified example data structures, according to some embodiments.

FIGS. 7A-7D illustrates an example of performing a read operation with the metadata management described herein, according to some embodiments.

DETAILED DESCRIPTION

Figure 1:
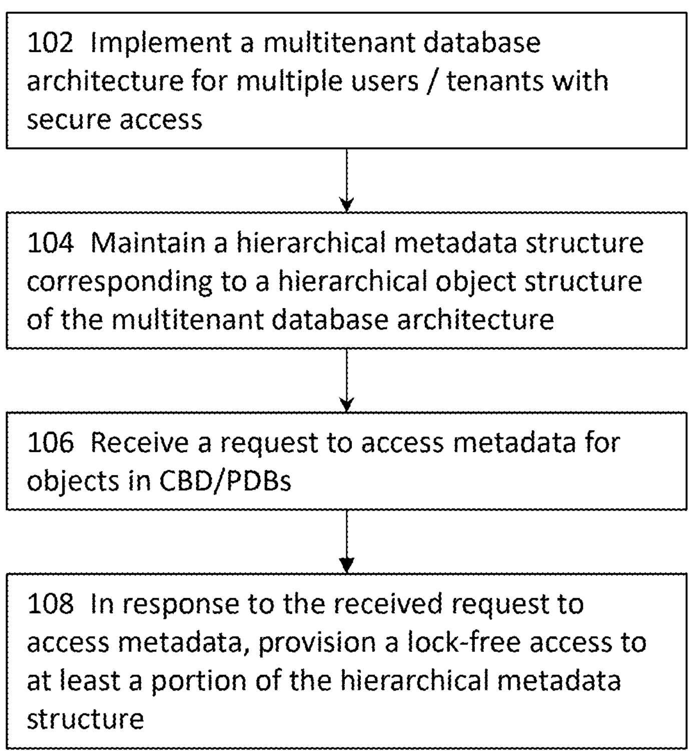
FIG. 1 illustrates a high-level block diagram for implementing metadata management in a database system in some embodiments.

A database nest provides the ability to attach data (e.g., custom data, user data, etc.) to, for example, route a database handler, which is a class that allows access to a database for reading and writing data as well as some interactions with the database such as creating tables, fetching columns, adding and/or deleting table rows, etc. For example, a nest may provide the ability to attach data to route handlers through SetMetadata (e.g., SetMetadata(key, value)) that stores one or more pairs of keys and corresponding values is one way to declaratively define and store the data about an endpoint such as a controller that may be used in an application programming interface (API) for clients to consume.

Cloud environments having databases consolidated from various tenants need to have secured, isolated, hierarchical, runtime execution environments for the tenant databases across database nodes in a cluster. Databases nowadays often support containerized execution through novel features such as database nests. For database nests, it is important to secure and have integral access to the hierarchical containers (nests) metadata from tenants'execution entities and other privileged users. In abnormal scenarios the metadata management should recover, self-heal and isolate the faulty tenant areas.

In an autonomous cloud environment, hundreds or thousands of tenant databases may be consolidated together as pluggable databases in isolated container databases that are hosted in compute appliances. Such a multi-tenant environment hosts an execution environment for thousands of clients within the consolidated databases. As a result, providing secure access to the tenant database entities in a hierarchical manner while isolating and preventing clients from accessing higher-level privileged resources is a vital requirement for the cloud management frameworks including consolidated databases and cloud appliances. The fact that a cloud tenant may rent out the tenant database entities or container databases simply exacerbates the challenges.

More particularly, a database provides isolated and hierarchical runtime requirements for the tenant databases through features such as database nests. These nests or containers have their own execution problem in securely managing their own metadata across the hierarchical tenant entities. For example, a low-level tenant execution entity should have access to its own container meta data and at the same time should not have access to the higher-level execution entities. When a muti-tenant database creates hierarchical container runtime environments (e.g., database nests) for pluggable databases (PDBs) and/or container databases (CDBs), the metadata management of these nests becomes a challenge.

Conventional approaches have attempted to address these challenges by using various locking mechanisms that nevertheless give rise to a new set of challenges and problems and thus constitute compromised solutions at best. For example, a locking mechanism, if not implemented properly or at the correct time, increases latency by causing more blocking and waiting among transactions, reduces concurrency and isolation of database transactions, data inconsistency, integrity violations, etc.

Furthermore, this metadata manager needs to be self-managing with respect to co-ordination across various hierarchical entities. Furthermore, it has to be light weight and has to have the following aspects:

- Secure: Given that competing cloud tenants can rent out the tenant database entities and/or container databases corresponding to these runtime entities—meta data information security of the objects is a non-negotiable requirement. Unintended information exposure and/or unauthorized information access should be prohibited by default configuration (i.e. with no additional steps/setup required) and by design. (i.e. not as an afterthought after setup/implementation).
- Hierarchical: Since the runtime entities are hierarchical in nature (can have parent-child relationships) the meta data objects also need to follow the same. Additionally, parent object can access its lower level (children's/grandchildren's etc.) metadata objects whereas the reverse should be disallowed.
- Scalable: The runtime entities should dynamically scale at runtime. For example the number of pluggable databases in a container database can be in the order of thousands. Depending upon the configuration this number can vary dynamically at runtime. The metadata object manager should also scale accordingly—i.e. increase/decrease with the dynamic increase/decrease of runtime entities it manages.
- Consistent: Every read/write operation of metadata from/to the metadata object store needs to be consistent and atomic in nature. In other words, partial and/or fractured read/write should not be possible by design. This has to be true even during concurrent and high volume operations.
- Robust: The metadata object manager needs has to have a robust design where there is no single point of failure. A single manager process (master PID) or a communication conduit can become single point of failures—if one or more of them get killed or are deleted from the system.
- Encryption: The metadata object manager should encrypt the metadata by default. Thereby rendering the unauthorized access futile without the decryption key. This adds further security to the objects inside the metadata object store.

The metadata management should provide the above required aspects using the required underlying primitives. For example, the underlying OS (e.g., Linux) provides several low level primitives using which the above requirements of the meta data management system can be met. Using shared memory primitives and or file system isolation based primitives are couple of options available.

Some database architectures have a Container Database (CDB) which can hold one or more Pluggable Databases (PDB) which can be plugged in and out of a container database and will always 'belong'to one and only one container database. There exists a parent-child relationship between container database and pluggable databases. Some databases also have the ability to create isolated, hierarchical runtime entities for each of the container database and pluggable database. These entities are known as nest objects. The meta data of these objects need to be stored in a fashion that satisfies the properties described in previous section. In every level, there can be multiple nest objects grouped together based on the isolation level in the hierarchy.

Some embodiments of the invention are directed to an implementation for managing hierarchical metadata. This implementation involves utilizing corresponding computing resources such as various data structures described herein, operating system primitives, other desired or required computing resources, etc. for performing a read operation by obtaining an object at an entry index, obtaining an internal handle from the object, and decoding the slot index from the internal handle. For example, some embodiments are directed to a model that implements the metadata management providing all the required aspects mentioned. To provide a higher level isolation, these embodiments group the metadata objects in the same level and isolate the same from the lower levels using low level primitives such as file system isolation.

The terms object entry index and entry index may be used interchangeably throughout the present disclosure. An entry index is distinguishable from a slot index. In some embodiments, an entry index may be provided in an external handle from a client and may also be referred to as an object index entry or an entry indicator. An entry index may be encoded in an external handle that corresponds to a specific metadata object for which access is desired or required. A slot index entry, on the other hand, corresponds to the physical or logical location, pointer, or link at which a corresponding object (e.g., a metadata object) may be identified in some embodiments. In some of these embodiments, a slot index may be encoded in an internal which in turn may be encoded in an external handle together with an object entry index (or simply entry index).

A handle comprises an abstract reference to a resource that is used when application software references one or more blocks of memory or objects that are managed by another system such as a database in some embodiments. In some of these embodiments, an external handle is or comprises an abstraction of a reference (e.g., a link, an address, a symbolic link, etc. to an object such as a metadata object) that is managed externally (e.g., external to a database instance such as a container database storing the objects of interest) and may be exposed to entities (e.g., tenants, clients, users, etc.) external to the database that uses the abstraction of the reference to locate the corresponding resource so that the opacity of an external handle allows the corresponding object to be located in memory without invalidating the handle when the actual physical or logical location of the object in memory is changed. An internal handle, on the other hand, includes information that is used by the aforementioned system such as the aforementioned database to locate the resource.

In some embodiments, a handle may be created for a database at a lower hierarchical level (e.g., a child level) by registering an external database such as a container database (CDB) or a non-container database at a higher hierarchical level (e.g., a parent level) when creating a database (e.g., a pluggable database) in a compartment which comprises a logical group of cloud infrastructure resources. An external handle is distinguishable from an internal handle in that an external handle is managed by a computing entity that is external and exposed at least partially to a requesting entity (e.g., a client) that sends an access request to the computing entity to access data (e.g., a metadata object) thereon via the external handle, while an internal handle includes information (e.g., address, location, reference, link, etc.) that is recognized by and referenced by the aforementioned computing entity to retrieve the data (e.g., a metadata object) on behalf of the requesting entity to fulfill the access request by referencing information in the internal handle.

This implementation may further obtain a buffer object that is present at the slot index, copy the object (e.g., a metadata object comprising a plurality of entries) into a buffer provided by the requester of the read operation, and set the lengths for completing the read operation. In some embodiments, whether a write operation is to update an existing object by creating a new object or by updating the current entry (or entries) of the existing object may be determined by the requester or programmatically based at least in part upon, for example, the number of pieces of data to be updated for the existing object. If it is determined to update an existing object, the object may be copied to a new slot in an object entry array by using the slot index (s_ind) or entry object (e_ind) provided by the requester.

Some embodiments utilize corresponding computing resources such as various data structures described herein, operating system primitives, other desired or required computing resources, etc. for performing a write operation by obtaining an entry object at an entry index. In some embodiments where a new object is to be written, an empty slot may be identified from an object entry array.

On the other hand, if a write operation is to update one or a certain number of pieces of data of an existing entry object, the corresponding slot in an external handle or the internal handle encoded in the external handle may be identified using the entry index or slot index provided with the request for the write operation. In some embodiments where an object comprises a plurality of entries that comprises, for example but not limited to, a slot index (s_ind), a generation count, and/or a type, etc.

A slot index entry corresponds to the physical or logical location, pointer, or link at which the corresponding object (e.g., a metadata object) may be identified. A generation count entry comprises a monotonically increasing sequence of numeric values or numbers that corresponds to the number of modifications or updates (e.g., create, modify, delete, etc.) on the objects that are managed by the metadata management implementation described herein and describe the corresponding database objects in a database system. In some embodiments, the generation count values may be identified from a pool of ordered numbers in a database sequence. A database sequence generally comprises unique objects (e.g., values). Every time a sequence is inquired to obtain a unique object (e.g., value), the sequence increments the current value (e.g., by shifting a current-value pointer) and returns the next value. In some embodiments, a database sequence comprises an ordered collection of objects (e.g., values) in which repetitions are prohibited. A type entry refers to the type of access that is permitted for a particular object entry in the object entry data structure or array. Some example types of access may include, without limitation, "I" or in-progress (e.g., an update to an object entry in an object entry data structure is currently in-progress), "O" or occupied for a slot or row that is currently used by an object entry in the object entry data structure (e.g., 316 in FIG. 3A), "F" or free for a slot or row that may or may not have been used but is free to use for creating a new object entry.

The values of corresponding entries provided with the request for the write operation may be populated into a buffer object, and a new (when a new slot is used) or updated (when an existing slot is used) external handle may be generated or updated by encoding the values of corresponding entries into an object entry in an object entry array or data structure. The information pertaining to the corresponding external handle and the internal handle encoded in the external handle may be atomically updated.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

FIG. 1 illustrates a high-level block diagram for implementing metadata management in a database system in some embodiments. In these embodiments, a multi-tenant database architecture may be implemented or identified at 102 with secure access for multiple users and/or tenants. In some of these embodiments, the multi-tenant database architecture may include a container database (CDB) that further includes one or more pluggable databases (PDBs) created in the CDB. More details about the multi-tenant database architecture in the form of CDB and/or PDB will be described below with reference to FIGS. 2A-2B.

A hierarchical metadata structure that corresponds to a hierarchical object structure of the multitenant database architecture implemented or identified at 102 may be maintained at 104. In some of these embodiments illustrated in FIG. 1, a metadata object at a hierarchical level in the hierarchical metadata structure respectively corresponds to an object at the hierarchical level in the multitenant database architecture. In some embodiments, the hierarchical structure of the hierarchical object structure is identical to that of the multitenant database architecture. In some other embodiments, the hierarchical structure of the hierarchical object structure includes that of the multitenant database architecture and constitutes a superset of the hierarchical structure of the multitenant database architecture while in yet other embodiments, the hierarchical structure of the hierarchical object structure is included with that of the multitenant database architecture and constitutes a smaller portion thereof.

The metadata management module may receive a request at 106 to access a metadata object for a corresponding database object in the multitenant database architecture. For example, a requester may need to access the corresponding database object in multitenant database architecture and hence needs to access the metadata object and hence submits a request for accessing the metadata object at 106. The metadata management module intercepts such a request and issues instructions to determine whether the request is to be fulfilled (e.g., whether the requester has the privilege to access the metadata object) and, if the determination result is affirmative, services and fulfills the request with an objective to provide security to the multitenant database objects by using primitives and various data structures described herein. More details about 106 will be described below with reference to FIGS. 4A-4B and 5A-5B.

In response to the received request to access metadata object for a corresponding database object in the multitenant database architecture, various techniques described herein implement or provision a lock-free access to at least a portion of the hierarchical metadata structure at 108 so as to service and fulfill the request in some of these embodiments. In some of these embodiments, the request may be fulfilled or serviced by provisioning an electronic communication including a pointer, a link, or a symbolic link to the object of interest for the requesting tenant to access the object.

A lock-free access requires no locks (e.g., exclusive lock, shared lock, intent exclusive lock, intent shared lock, shared intent exclusive lock, and/or update lock) at one or more of the database level, table level, page level, or row level so as to avoid drawbacks of locking. A lock-free access comprises accesses to the at least the portion of the hierarchical metadata structure without using any locks at least one of the database level, the table level, the page level, or the row level in some embodiments. In some of these embodiments, a lock-free access described herein accesses the target object without using any exclusive locks that ensure that the data or information that does not already have any shared locks or another exclusive lock is reserved exclusively for the requesting entity that currently owns the exclusive lock. In some of these embodiments where the requested access is a read request, a lock-free access described herein accesses the target object without using any shared locks that are usually applied to the aforementioned page level or row level and may be applied to the target (e.g., a page or a row) together with one or more other shared locks.

In some embodiments, a lock-free access described herein accesses the target object without using any intent exclusive locks for locking lower level of resources for modification with a separate exclusive lock. In some embodiments, a lock-free access described herein accesses the target object without using any intent shared locks that are usually used to lock a database resource (e.g., a lower-level database resource) using a shared lock. In some embodiments, a lock-free access described herein accesses the target object without using any shared intent exclusive locks that are usually used to lock database resource(s) using a shared lock for a read operation so that the database resource(s) is locked explicitly in a shared mode. In some embodiments, a lock-free access described herein accesses the target object without using any update locks that usually apply a shared lock to a database record that has already had another shared lock and modify the subsequent update lock into an exclusive lock.

Some of these embodiments may utilize a set of primitives. A primitive includes one of a set of fundamental language elements that serve as the foundation for a programming language or an operating system. Each language supports a core set of primitives that provide the basic building blocks for instructing a processor on how to carry out specific operation(s). The primitives indicate what the processor is capable of doing, such as adding data or loading it into a specific location in memory, according to some embodiments.

A primitive may be associated with a specific operation code (opcode). An opcode is the binary equivalent of the primitive that tells the processor what operation to carry out. An opcode is typically accompanied by operands, which represent the data to be manipulated by the primitive. Operands are defined as part of an instruction in which primitives serve as the operator. More details about 108 will be described below with reference to FIGS. 6A and 7A-7D.

Figure 2A:
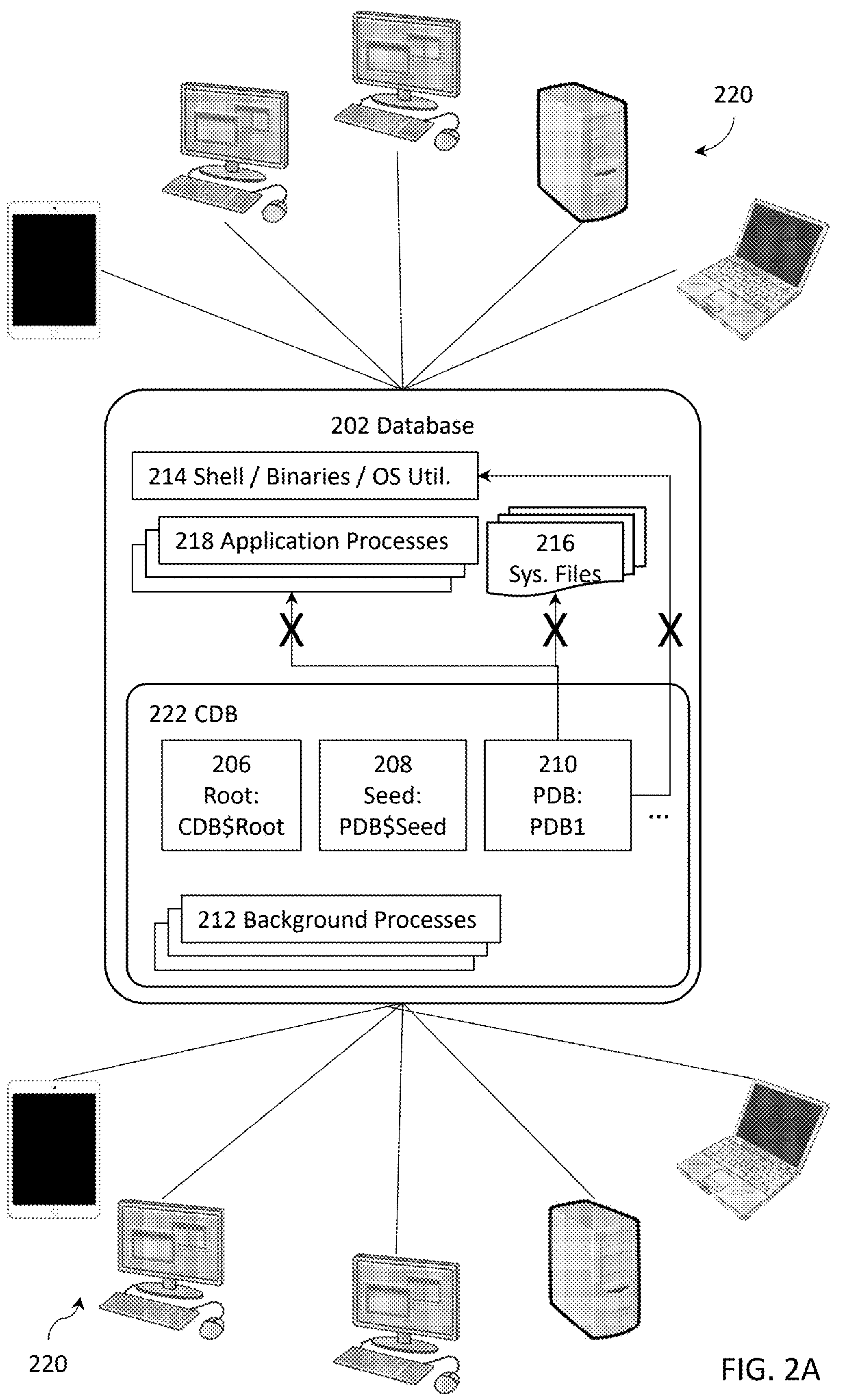
FIG. 2A illustrates a simplified schematic diagram of a CDB/PDB architecture according to some embodiments.

FIG. 2A illustrates a simplified schematic diagram of a CDB/PDB architecture according to some embodiments. In these illustrated embodiments, a database system 202 hosting a database instance with a multitenant database architecture is provided for a plurality of users or tenants 220. The database 202 may also include a shell (e.g., SQL shell using dynamic SQL to prepare and execute queries at runtime), a set of binaries, operating system utilities, etc. 214, system files 216, and a set of one or more application processes 218.

The database 202 may be implemented to include a container database 222 although the database 202 may include multiple containers such as a plurality of container databases. The container (also referred to as container database or CDB) further includes, for example, the root 206 named CDB$ROOT that comprises, without limitation, metadata, information pertaining to common users, etc. CDB 202 may further include a seed pluggable database (PDB) 208 named PDB$SEED that comprises a template that may be used to create one or more PDBs. In some of these embodiments, objects in the seed PDB may not be modified. A CDB thus includes one seed PDB and may further include zero or more PDBs created by using the seed PDB.

A container comprises a collection of schemas, objects, and related structures in a multitenant container database (CDB). Within a CDB, each container has a unique identifier (ID) and name in some embodiments. A CDB may include zero, one, or many pluggable databases (PDBs) and zero or more application containers. A PDB is a portable collection of schemas, schema objects, and non-schema objects that appears to a database client as a separate database. An application container includes an optional, user-created CDB component that stores data and metadata for one or more application backends. A CDB includes zero or more application containers.

Using this seed PDB, a PDB 210 may be created under the CDB 222 with sufficient privileges. One of the benefits of a multitenant database architecture as the one illustrated in FIG. 2A is that PDBs and CDBs use resources on a server more effectively when compared to virtual machines (VMs), which oftentimes duplicate the operating system, and separate databases which often do not share processes. Another benefit is that a PDB in this architecture may be easily moved from, for example, a first CDB to a second CDB by connecting to the second CDB using a username, a password, and service name or service identifier such as a Docker image service name or other service name. A PDB may be similarly connected by first creating the PDB (the PDB need to exist in order to connect to it) and then connecting the PDB by specifying the service (e.g., the service name of the PDB), instead of the PDB or the identifier of the PDB, and by providing the requisite username and password.

The CDB 222 may also include one or more database background processes 212 in some embodiments. Some example background processes may include, without limitation, a process coordinator for performing some administrative tasks such as starting, stopping, etc., a storage management process for the file system, a control file to memory service process for coordinating consistent updates to a control file resource, or any other desired or required background processes that execute in the background to facilitate provisioning database services to the plurality of tenants 220. In the CDB nest 222, a child nest (e.g., PDB 210) only has access to relevant file system, trace files, and files within its own nest and manages its own computing resources (e.g., CPU or central processing unit, memory, network resources, etc.) but has no access to parent level applications or resources (e.g., 214, 216, 218, etc.) to provide security to such parent level applications or resources.

A pluggable database (PDB) comprises a portable collection of schemas, schema objects, and non-schema objects. One or more PDBs may be plugged into a container database (CDB). A container database (CDB) may contain one or multiple PDBs. Each PDB may appear on the network as a separate database. When a database is created as a CDB into which one or more PDBs are plugged, a PDB may or may not be started automatically on any CDB instance in some embodiments. A PDB may be available on one or more CDB instances. Whether a PDB is available on more than one CDB instance may be managed by the services running on the PDB or may be manually enabled in CDB instance by starting the PDB instance on the CDB instance. PDB access may be manually or programmatically enabled on each instance of a CDB by starting a PDB manually (or programmatically) on that instance.

Figure 2B:
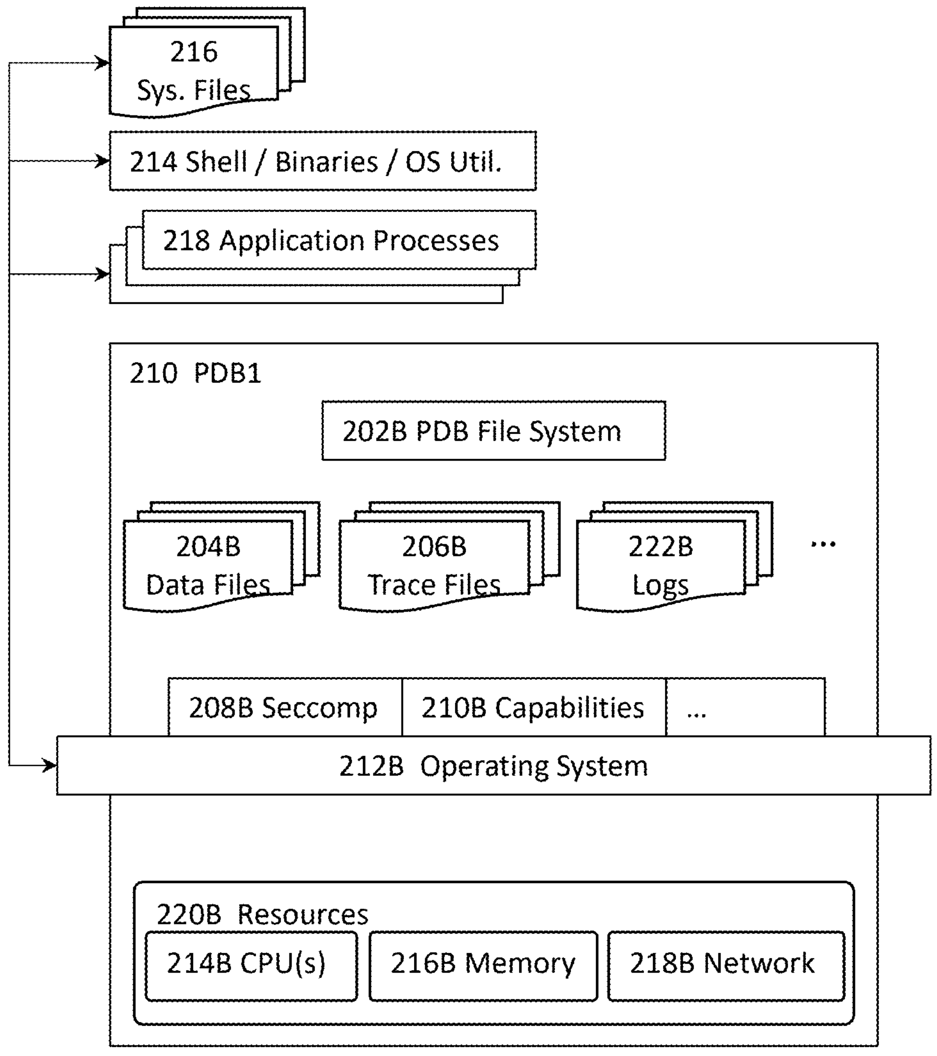
FIG. 2B illustrates more details about a PDB architecture in FIG. 2A according to some embodiments.

FIG. 2B illustrates more details about an example PDB architecture in a CDB nest (e.g., 222 in FIG. 2A) in FIG. 2A according to some embodiments. More specifically, the example PDB architecture 210 may operate in conjunction with the operating system 212B that further functions in conjunction with the shell, binaries, operating system utilities 214, the system files 216, and the set of one or more application processes 218. A pluggable database (PDB) is a portable collection of schemas, schema objects, and non-schema objects that appears to a client as a non-CDB. One or more PDBs may be plugged into to a CDB. A CDB may include multiple PDBs, and each PDB appears on the network as a separate database and may be owned by a common user (e.g., a common user such as SYS that exists with the same identify in multiple containers including existing and future PDBs or existing and future application PDB in an application container) in the CDB. One difference between a CDB and a non-CDB in the installation process is to choose whether to create a database as a CDB or a non-CDB. If a database is created as a CDB and plug one or more PDBs into the CDB, then, by default, a PDB is not started automatically on any instance of the CDB in some embodiments. With the first dynamic database service assigned to a PDB (other than the default database service which has the same name as the database name), the PDB may be made available on those instances on which the service runs. Whether a PDB is available on more than one instance of a CDB may be typically managed by the services running on the PDB in some embodiments, although a PDB access may be manually enabled on each instance of a CDB by starting the PDB manually on that CDB instance in some of these embodiments.

The pluggable database 210 in the CDB nest (e.g., 222 in FIG. 2A) only has access to, for example yet without limitation, relevant PDB file system 202B, trace files 206B, and files within its own nest (e.g., one or more logs 222B, data files 204B, etc.) and manages its own computing resources 220B (e.g., CPU or central processing unit 214B, memory 216B, network resources 218B, etc.), secure computing mode (seccomp) 208B, and one or more capabilities 210B, etc. but has no access to parent level applications or resources (e.g., 214, 216, 218, etc.) to provide security to such parent level applications or resources at the parent nest hierarchy (e.g., 302) or any hierarchies beyond the parent nest hierarchy.

Figure 3B:
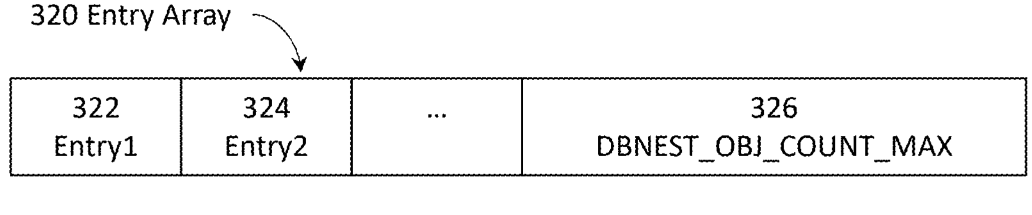

FIGS. 3A-3B illustrate some simplified example data structures, according to some embodiments. More specifically, 300 illustrates an example encoding layout of an external handle that encodes an entry index or entry indicator 302 and an internal handle 304 and may be used to access a metadata object by using the entry index or entry indicator 302 and the internal handle 304 as described in greater details below. In some of these illustrated embodiments, the external handle may have a 64-bit length and encodes a 32-bit entry index or entry indicator 302 and a 32-bit internal handle 304.

The data structure 306 illustrates the encoding layout of an example internal handle (e.g., 304 encoded in the external handle 300). An internal handle may encode information pertaining to a type (e.g., access type to the entry for the internal handle 306 where the type information pertains to an access type pertaining to the object entry). Some example types of access may include, without limitation, "I" or in-progress (e.g., an update to an object entry in an object entry data structure is currently in-progress), "O" or occupied for a slot or row that is currently used by an object entry in the object entry data structure (e.g., 316 in FIG. 3A), "F" or free for a slot or row that may or may not have been used but is free to use for creating a new object entry. In some of these embodiments, the type entry 308 may have a 4-bit length, the generation count entry 310 may have a 13-bit length, the slot index entry 312 may have a 13-bit length for a total of 8192 objects (2◯=8192), and the unused bits may be 2 bits for a total of 32 bits for an example internal handle.

The internal handle may further encode a generation count 310 which comprises a monotonically increasing sequence of numeric values or numbers that corresponds to the number of modifications or updates (e.g., create, modify, delete, etc.) on the objects that are managed by the metadata management implementation described herein and describe the corresponding database objects in a database system. The example internal handle 306 may further include a slot index 312 that corresponds to the physical or logical location, pointer, or link at which the corresponding object (e.g., a metadata object) may be identified and may be cross referenced among multiple data structures or arrays as described in greater details below. An example internal handle may also optionally include one or more unused bits 314 for subsequent use in some embodiments.

Reference numeral 316 illustrates an example object entry data structure (or simply object entry structure) for an external handle (e.g., 300) that encapsulates an internal handle (e.g., "ihdl" in 316 or 306 described above); and reference numeral 318 illustrates an example object buffer data structure or simply object buffer structure that includes one or more objects (e.g., metadata objects) that may be managed by the metadata management implementation described herein.

As a working example, given an object's entry index or entry indicator (302), the object entry structure (316) corresponding to the external handle (e.g., 300) may be accessed to identify the internal handle (e.g., 306) encapsulated in the object entry structure (e.g., "ihdl" in 316). The internal handle in the external handle may be decoded based at least in part upon the information identified from the object entry structure 316. With the internal handle (e.g., 306) decoded, the slot index (e.g., 312) encoded in the internal handle (e.g., 306) may be identified or extracted. Once the slot index (e.g., 312) is identified or extracted from the internal handle (e.g.,306), the slot index may be used to identify the object from the object buffer structure (e.g., 318). In this manner, the objects are not directly exposed to a requesting tenant for enhanced security.

FIG. 3B illustrates an entry data structure or array 320 that may represent a segment of a metadata object store and may store a plurality of entries (322, 324, etc.) and a maximum object count of the database nest 326 (e.g., the CDB nest 222). A buffer array or data structure 328, which may represent a different segment of a metadata object store, may store a plurality of objects (e.g., database data objects, user objects, etc. such as 330, 332, etc.) and the maximum object count 334 of the database nest (e.g., the CDB nest 222) which may be identical to 326 in some embodiments. Reference numeral 336 includes some example code for how the maximum object count of a database nest may be defined.

Reference numerals 320 and 328 represent respective segments of a metadata object store and may be protected using, for example, low-level OS (operating system) primitives such as Compare And Swap (CAS) processor instruction that may atomically change the location of the object entry (e.g., the object entry or external handle 300 in FIG. 3A) in the entry array 320. It shall be noted that although the entry array 320 and the buffer array 328 are illustrated in FIG. 3B as a single row of data structure, various other data structures such as a column structure or a table structure may also be utilized in some other embodiments. For a write or update operation, an empty slot may be identified. The process then populates the identified empty slot with existing object's value(s), updates the value(s) with what the requester passed in the request, and atomically switches the internal handle pointer so that pointer now points to the new internal handle for the updated or new object with the value(s) passed by the requester.

This metadata management system described herein is robust by design in some embodiments because there is no one component that may fail and cause the system to shut down. Further, there is no manager or master—slave process that may potentially become single point of failures to the object management system in at least some of these embodiments. Even in some embodiments where a metadata management module may intercept a request for accessing metadata objects and issue instructions to determine whether and/or how the request is to be fulfilled while providing secure access in a multitenant database architecture in which multiple user groups (e.g., tenants) access to respective instances of an application, a system, or a virtualized system (e.g., a virtual machine or a virtual container) while sharing the same infrastructure, the metadata management module may be distributed, rather than being implemented as a centralized authority, among multiple nodes or instances that accommodate multiple tenants, regardless of whether the metadata management module is implemented as a monolithic application, a service, a set of microservices, etc. Therefore, the metadata management system eliminates or at least reduces the possibility of single point of failure and satisfies the robustness criterion. In some embodiments, all read and/or write operations may further proceed through a set of decryption and encryption functions to further add to the security.

Figure 4A:
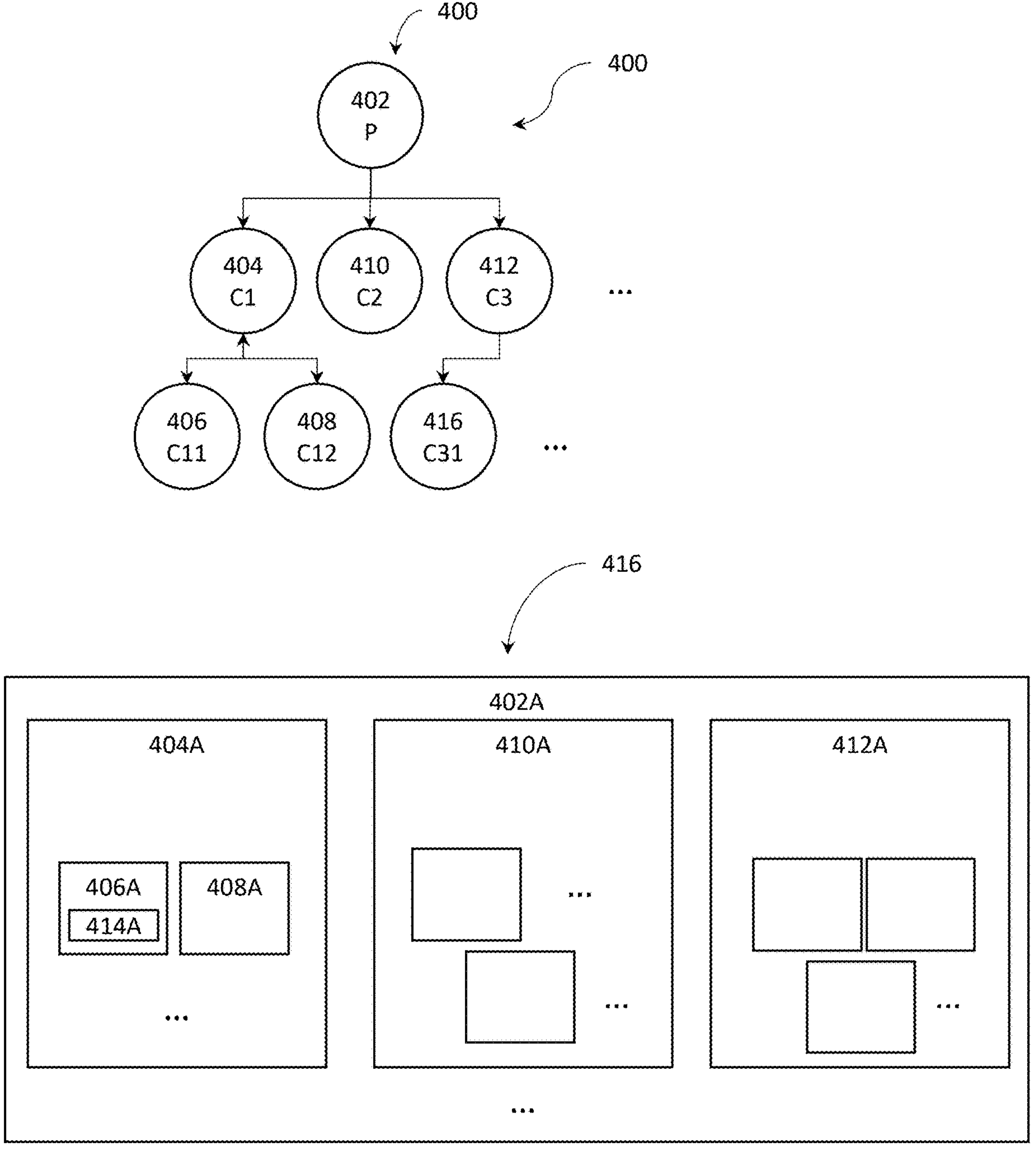
FIG. 4A illustrates a simplified schematic diagram of an example entry object structure and an example buffer object structure, according to some embodiments.

FIG. 4A illustrates a simplified schematic diagram of an example entry object structure and an example buffer object structure, according to some embodiments illustrated in reference numeral 106 of FIG. 1 and described above. Conventional metadata stores all the database nests in a flat hierarchy. For example, a grandparent database nest, a parent database nest, and a child database nest reside at the same hierarchy in the object metadata store, and as a result, all the database nest objects have access to the shared memory holding the metadata object storage. In contrast, various embodiments described herein stored metadata objects in a hierarchical arrangement in the object metadata store where the hierarchical structure of these metadata objects corresponds to the hierarchical structure of the database objects.

For example, a portion (e.g., an entry object structure) 400 of the hierarchical structure may include a grandparent hierarchy 402 at a first hierarchy. The grandparent hierarchy may include three child hierarchies 404 (C1), 410 (C2), and 412 (C3) at a second hierarchy that is directly below the first hierarchy 402. The first child hierarchy 404 (C1) may further include two grandchild hierarchies 406 (C11) and 408 (C12) that are located at a third hierarchy that is directly below the second hierarchy (e.g., 404, 410, and 412). The third child hierarchy 412 (C3) may include one or more grandchild hierarchies such as 416 (C31) that is located at the same third hierarchy with 406 and 408, where the one or more grandchild hierarchies (e.g., 414) is located directly below the second hierarchy (e.g., 404, 410, and 412).

Reference numeral 416 illustrates a logical representation of the corresponding example buffer object structure that stores the objects. The hierarchical structure of the entry object structure 400 corresponds to the hierarchical structure of the buffer object structure 416 that stores the objects. For example, the buffer object structure 416 includes a first object 402A at a first hierarchy that maps or is mapped to the first hierarchy 402 of the hierarchical entry object structure 400, three second objects 404A, 410A, and 412A at a second hierarchy that maps or is mapped to the second hierarchy (e.g., the hierarchy at which 404, 406, and 408 are located) of the hierarchical entry object structure 400, and third objects 406A and 408A at a third hierarchy that maps or is mapped to the third hierarchy (e.g., the hierarchy at which 406, 408, and 416 are located) of the hierarchical entry object structure 400. The buffer object structure 416 further illustrates that the object 406A may further includes a child object 414A that is located at an even lower hierarchy.

Figure 4B:
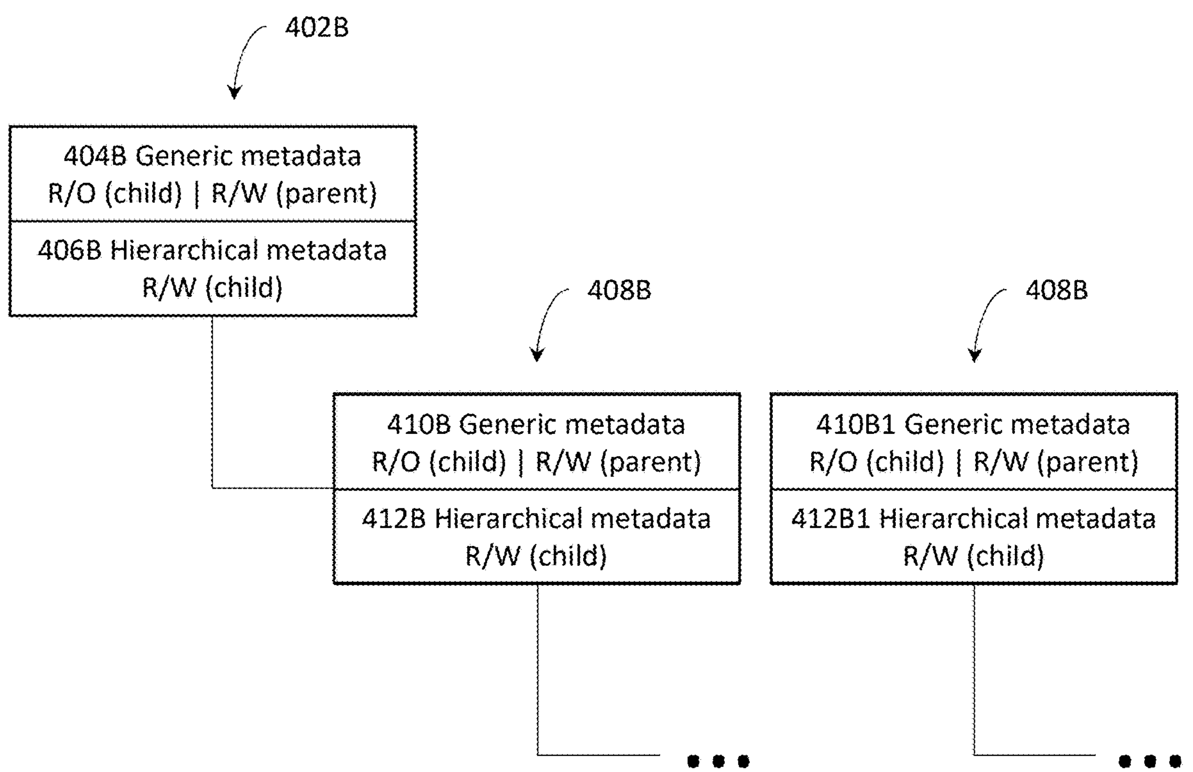
FIG. 4B illustrates an example parent-child relationship between a parent metadata object and a plurality of child metadata objects, each having generic metadata and hierarchical metadata, according to some embodiments.

FIG. 4B illustrates an example parent-child relationship between a parent metadata object and a plurality of child metadata objects, each having generic metadata and/or hierarchical metadata, according to some embodiments illustrated in reference numeral 106 of FIG. 1 and described above. In these embodiments, a metadata object at a hierarchy corresponding to a hierarchy in a database nest may separate metadata as generic metadata and hierarchical metadata and may manage the generic and hierarchical metadata respectively, separately according to their respective privileges. For example, a parent nest metadata object (or simply a parent metadata object) 402B may separate the metadata into generic metadata 404 and hierarchical metadata 406.B The metadata object 402B owns the generic metadata 404 and thus allow its child metadata objects (e.g., 408B and 408B1) to have both read and write access to the hierarchical metadata 406B but only have read-only access to the generic metadata 404B.

Similarly, the child nest metadata object (or simply a child metadata object) 408B may separate the metadata into generic metadata 410B and hierarchical metadata 412B. The metadata object 408B owns the generic metadata 410B and thus allow its child metadata objects (not show but located at a lower hierarchy) to have both read and write access to the hierarchical metadata 410B but only have read-only access to the generic metadata 412B. Further, the child nest metadata object (or simply a child metadata object) 408B1 may separate the metadata into generic metadata 410B1 and hierarchical metadata 412B1. The metadata object 408B owns the generic metadata 410B1 and thus allow its child metadata objects (not show but located at a lower hierarchy) to have both read and write access to the hierarchical metadata 410B1 but only have read-only access to the generic metadata 412B1.

Figure 5A:
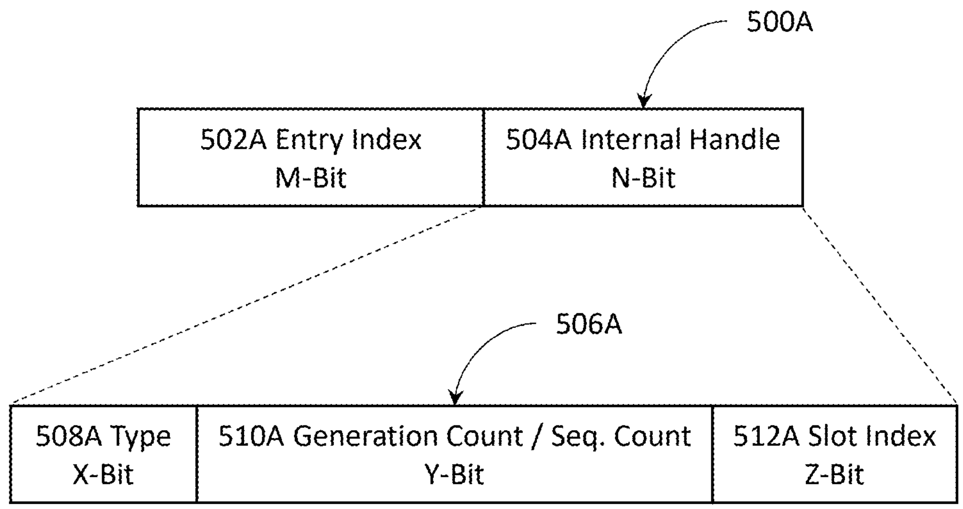
FIG. 5A illustrates an example external handle that encodes an internal handle and an entry index that may be utilized to implement metadata management in some embodiments.

FIG. 5A illustrates an example external handle that encodes an internal handle and an entry index that may be utilized to implement metadata management in some embodiments. As described above, an external handle may have the example encoding layout 500A that includes a first entry for the entry index 502A having an M-bit length (e.g., 32-bit) and a second entry for the internal handle 504A having an N-bit length (e.g., 32-bit). It shall be noted that the lengths of the entry index 502A and the internal handle 504A need not be equal.

506A illustrates the example encoding layout of the internal handle 504A that includes, without limitation, a type entry 508A (e.g., access type to the entry for the internal handle 306 where the type information pertains to an access type such as in-progress, free, occupied, etc. pertaining to the object entry) having an X-bit length (e.g., 4-bit), a generation or sequence count 510A having a Y-bit length (e.g., 13-bit), and a slot index entry 512A having a Z-bit length (e.g., 13-bit). As described above, an internal handle may optionally include one or more unused bits that are not shown in FIG. 5A.

Figure 5B:
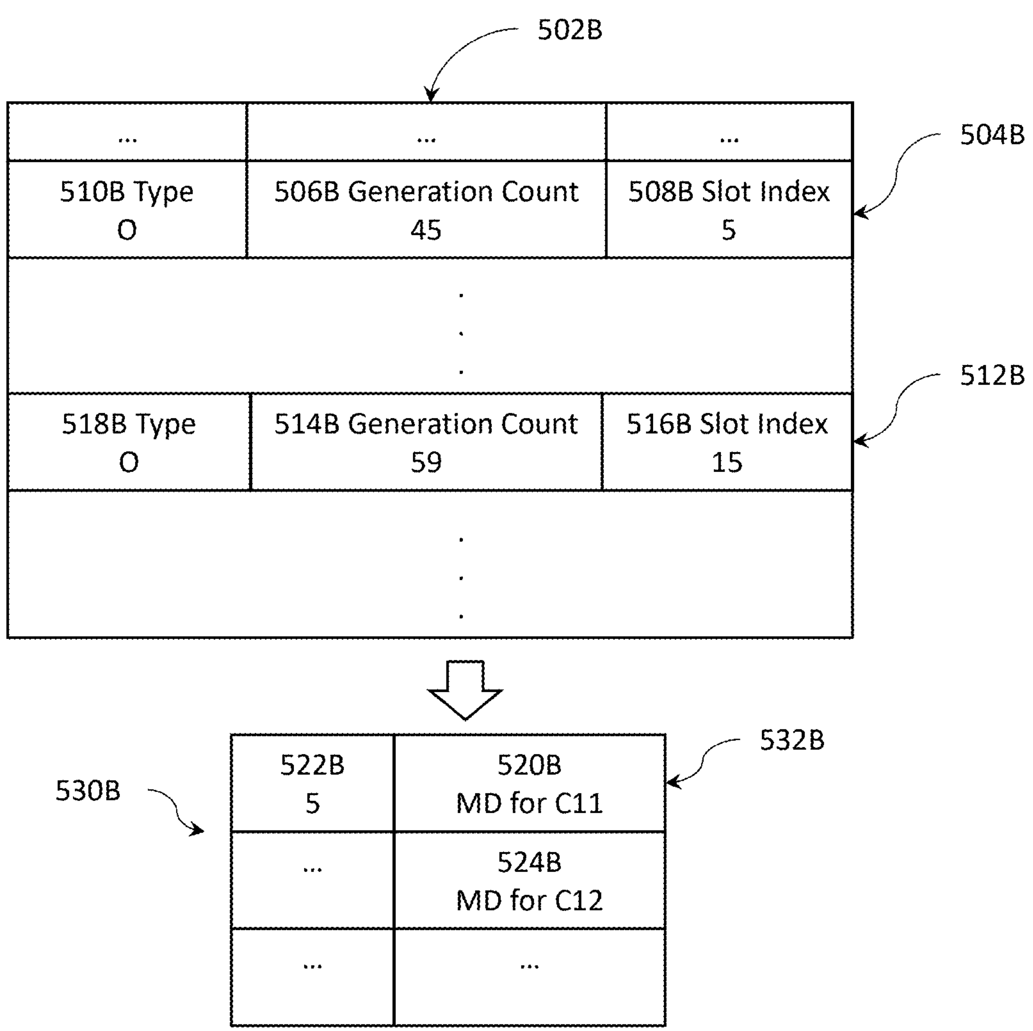
FIG. 5B illustrates an example object entry structure and an example object buffer structure that may be utilized to implement metadata management in some embodiments.

FIG. 5B illustrates an example object entry structure and an example object buffer structure that may be utilized to implement metadata management in some embodiments. More particularly, FIG. 5B illustrates that the example object entry structure (or array) 502B includes a first object entry 504B which encodes an internal handle having a type entry 510B with the value of "Occupied" or "O", a generation count entry 506B having the numeric value of forty-five ("45"), and a slot index entry 508B having the numeric value of five ("5"). The example object entry structure illustrated in FIG. 5B further includes a second object entry 512B which encodes an internal handle having a type entry 518B with the value of "Occupied" or "O", a generation count entry 514B having the numeric value of fifty-nine ("59"), and a slot index entry 516B having the numeric value of fifteen ("15"). It shall be noted that an internal handle encoded in an object entry structure (e.g., 502B) may include one or more additional entry fields (e.g., a field of one or more bits that are unused or reserved) that are not shown in FIG. 5B for simplicity.

FIG. 5B also illustrates an example object buffer structure 530B that corresponds to the example object entry structure (or array) 502B and stores objects (or links to the storage locations of objects) such as metadata objects 520B and 524B. Each of the objects stored in the object buffer structure 530B corresponds to an index value that is referenced by an internal handle for accessing the corresponding object stored in the object buffer structure 530B. For example, object 520B corresponds to the index value 522B having an example value of five ("5"). An access to the object 520B may reference the slot index 508B (which has a numeric value of 5) to identify the matching index value 522B for the corresponding object 520B.

Figure 6A:
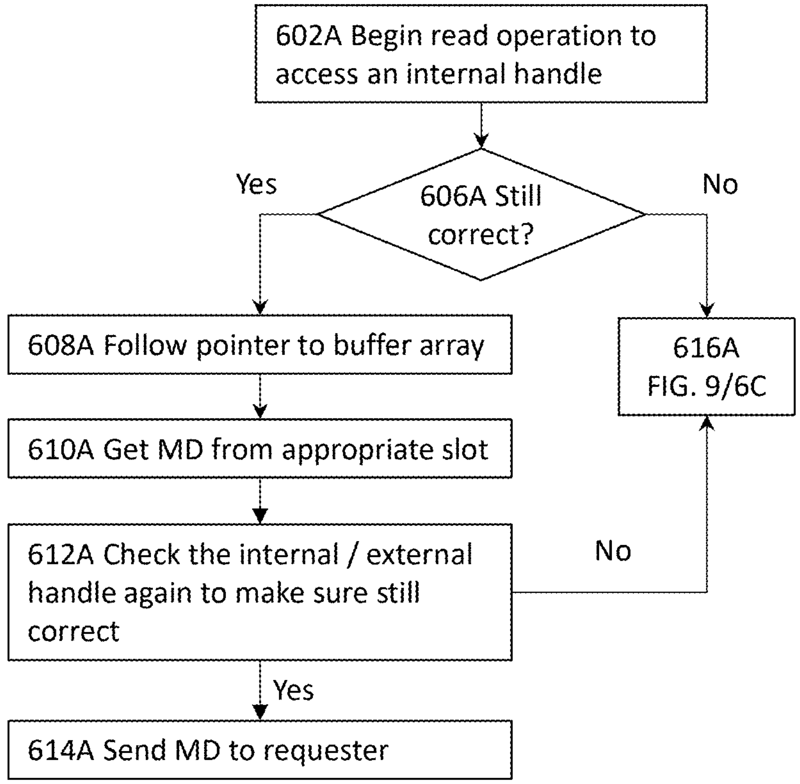
FIG. 6A illustrates an example block diagram for performing a read operation with the metadata management described herein, according to some embodiments.

FIG. 6A illustrates an example block diagram for performing an operation (e.g., a read operation) with the metadata management described herein, according to some embodiments illustrated in reference numeral 108 of FIG. 1 and described above. In these illustrated embodiments, a read operation by a requester may be initiated at 602A to access an external handle. For example, a requester may request for accessing a metadata object that corresponds to a database object by using the slot index value and generation count that were previously sent to the requester (e.g., in the form of a client's handle during or for the last access to the metadata object). In order to ensure that the requested metadata object may be accessed, some embodiments access the internal handle stored at an object entry structure at 602A and determine whether the information (e.g., the requesting tenant's handle) that is passed with the request for the read operation is still correct at 606A in view of the internal handle stored at the object entry structure. Some embodiments may optionally check to determine whether the requester or the requested read operation has the privilege to read the requested metadata object prior to performing the operations illustrated in FIG. 6A. If the determination is negative, the request for reading the metadata object may be denied. Otherwise, the process may proceed to 602A.

If the information (or the tenant's handle) passed with the request is determined at 606A to be incorrect, the process proceeds to 616A to perform the operations illustrated in FIGS. 6C and 9 that are described in greater details below. For example, the metadata object may have been modified, and thus the generation count, slot index, or both for the internal handle corresponding to the metadata object of interest may have already been updated and thus do not match the information (or the tenant's handle) passed with the request for the read operation, On the other hand, if the information (or the tenant's handle) passed with the request is determined at 606A to be correct, the slot index value encoded in the internal handle and matching the corresponding index value sent along with the request is referenced at 608A to a buffer object array or buffer object structure, and the metadata object stored in the buffer object array (or the link or pointer stored in the buffer object structure for the metadata object) may be obtained at 610A. The metadata object may be directly sent to the requester in some embodiments or may be buffered first and subsequently sent to the requester in some other embodiments.

A determination is checked again at 612A to determine whether the information on the requester and pertaining to the metadata object's internal handle (or the external handle encoding the internal handle) is still correct in view of the internal handle that is encoded in a corresponding external handle stored in the aforementioned object entry structure stored on a server. This determination at 612A is to ensure that the requested object has not changed from the time that the request for a read operation is received or serviced and the time shortly before or after the requested object is sent to the requester. If the information from the requester (e.g., generation count and slot index transmitted to the requester in its previous access) still matches that of an internal handle of the requested metadata object, the metadata object is deemed up-to-date and may thus be sent to the requester or committed in a persistent storage for the requester. Otherwise, the requested metadata object is deemed outdated, and the process proceeds to 616A that will be described in greater details below with reference to FIGS. 6C and 9.

Figure 6B:
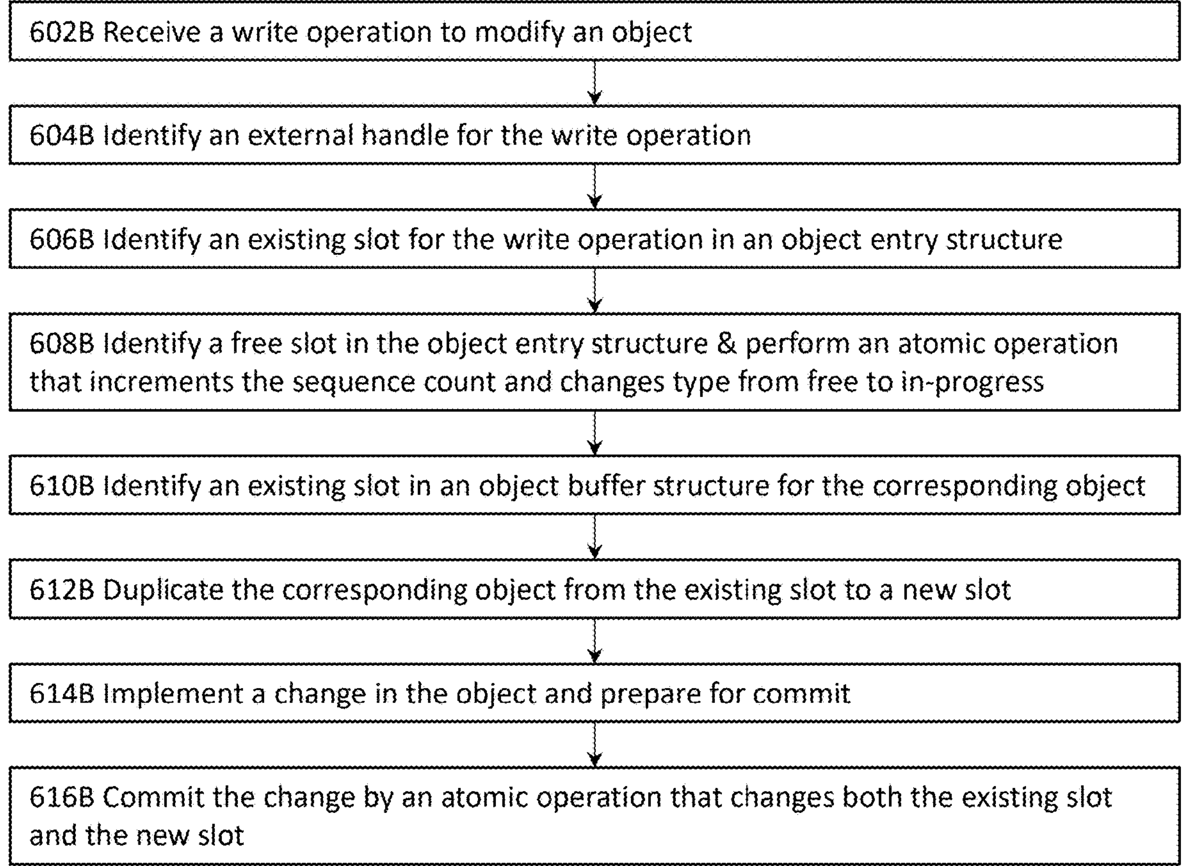
FIG. 6B illustrates an example block diagram for performing a write operation with the metadata management described herein, according to some embodiments.

FIG. 6B illustrates an example block diagram for performing a write operation with the metadata management described herein, according to some embodiments illustrated in reference numeral 108 of FIG. 1 and described above. In these illustrated embodiments, the metadata management system may receive a write operation to modify an object (e.g., a metadata object for a database object) at 602B. In some requests, the metadata management system may optionally first check the requester of the requester or the write operation has sufficient privilege to perform the write operation on the object. If the determination result is negative, the metadata management system may deny the write operation. Otherwise, the metadata management system may further proceed with the flow illustrated in FIG. 6B.

In response to the received write operation, an external handle may be identified at 604B for the write operation or the object. For example, the metadata management system may receive a request for the write operation together with a slot index value and a generation count value from a requesting tenant and use the slot index value and/or the generation count value to identify the corresponding external handle. An external handle encodes an object's entry index or entry indicator (e.g., 302 in FIG. 3A) and an internal handle (e.g., 304 in FIG. 3A) in the corresponding internal handle encoded in the external handle. In a request for a read or a write operation, the metadata management system receives the request together with an object's entry index that may be encoded in an external handle and may thus be referenced in the identification of the external handle at 604B.

In some embodiments, the object entry index for an object in an object entry structure or array may remain unchanged for the object. For example, updates or modifications to the object are made in such a way to modify the existing object entry including the object entry and the internal handle in the object entry structure in some embodiments, and hence the object entry index remains unchanged for this object. In some other embodiments, an update or modification to an object entry of an object may be made by identifying a new slot in the object entry structure and further by populating unchanged entry value(s) (e.g., the slot index, etc.) from the existing object entry and by further populating new entry value(s) (e.g., generation count, type, etc.) into the corresponding field(s) of this new object entry. In these latter embodiments, a link or pointer structure may be maintained to link the existing object entry and the new object entry. When a requesting tenant sends a request for a read or write operation together with an object index (or a slot index), the metadata management system may check the link or pointer structure to identify the matching object index or the matching slot index even though one or more new object entries have been created for the same object due to updates or modifications.

At 606B, an existing slot that corresponds to the external handle identified at 604B may be identified in an object entry structure or array in some embodiments. For example, a metadata management system may use the object entry index received from a requesting tenant to identify the external handle that encodes the matching or linked object entry index to identify the existing slot for the write operation to operate on. In some embodiments, a new or free slot may be identified at 608B to correspond to the existing slot. An atomic operation may be performed to increment the generation count (or sequence count) and also to change the type of access from, for example, free to in-progress to signify that this object entry in the object entry data structure is currently being updated.

An existing slot corresponding to the object requested may also be identified in a buffer structure or array at 610B. A buffer structure or array stores the objects (e.g., metadata objects arranged in a hierarchical structure) in some embodiments or respective links to these objects in some other embodiments. In some embodiments, the data for the new slot in the buffer structure or array may be duplicated or populated at 612B from the data in a corresponding, existing slot for the object in the buffer structure or array.

For example, the entire data for an object in an existing slot may be populated into the new slot, and the changes passed from a write request may be populated to update the corresponding pieces of data in the new slot for the object in some embodiments. In some other embodiments, unchanged pieces of data from an existing slot for an object may be duplicated from the existing slot to the new slot for the object while changes in a write request may be populated to the corresponding fields in the new slot for the object.

A change (e.g., a change passed from a request for a write operation) may be implemented (e.g., by populating the change into the corresponding field in the new slot identified at 610B) and prepare to commit the change at 614B. For example, a change passed from a write operation may be implemented in a corresponding field in the new slot for the object at 614B and prepare the updated object for storage in a persistent storage device such as a disk drive or persistent memory. The change may then be committed at 616B by an atomic operation that changes data in both the existing slot and the new slot in an all-or-none manner to observe the atomicity requirement. For example, the generation count value in the existing slot may be incremented to the next available value in the generation sequence due to the update or modification to the metadata object by the write operation, and the type of access for the existing slot may be modified from occupied (O) to free (F) because of the now-available metadata object stored in the new slot in the buffer structure. Moreover, the access type for the new slot was in-progress during the update or modification process so the access type for the new slot may be changed to occupied (O) from in-progress (I). These changes to both the existing slot and the new slot may be performed in an atomic manner in some embodiments. In some of these embodiments, these changes to both the existing slot and the new slot as well as the commit operation may be performed in an atomic manner so either all of these operations occur or none of them occur.

Figure 6C:
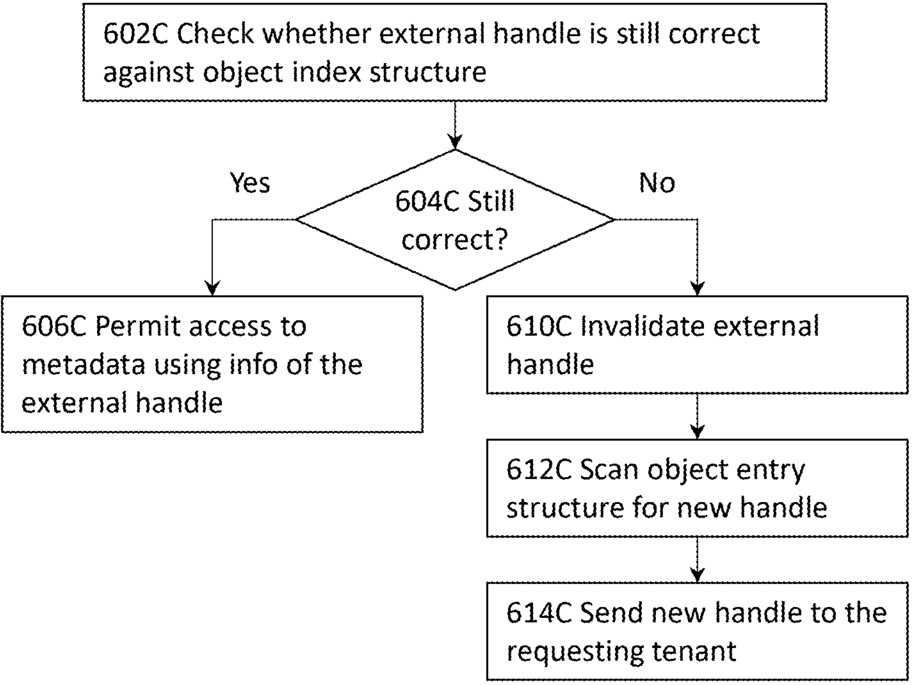
FIG. 6C illustrates a block diagram for implementing metadata management in some embodiments.

FIG. 6C illustrates a block diagram for implementing metadata management in some embodiments. More specifically, FIG. 6C illustrates a block diagram for access metadata using an external handle with the metadata management platform described herein. At 602C, the metadata management platform may receive a request for accessing a metadata object managed by the metadata management platform and checks the external handle information associated with the incoming request. For example, a requesting tenant in the multitenant architecture may send an access request (e.g., read request, write request, etc.) together with the latest information (e.g., the object entry index value or entry indicator (302), the generation count value, and/or the slot index value) of an external handle that the requesting tenant believed to be current for accessing a metadata object.

The metadata management platform may then determine whether the external handle information is still correct by consulting, for example, an object entry array (e.g., 320 in FIG. 3B) that is maintained by the metadata management platform. As described above, the generation count is incremented every time a metadata object managed by the metadata management platform is updated or modified. Further, if a write operation operates on a new slot in the object entry array (e.g., 320 in FIG. 3B) or the object buffer array (e.g., 328 in FIG. 3B), rather than operating on an existing slot for the object, the slot index value corresponding to the object in the object entry array may also change. A change in the generation count value (or sequence count value) and/or the slot index value renders the then-current external handle information made aware to a tenant outdated. In this case, the external handle information associated with the access request is deemed incorrect at 604C.

If, however, the external handle information associated with the access request is deemed correct at 604C, access to the object is granted at 606C by using the information or data (e.g., the slot index 512A and/or the object entry index 502A in FIG. 5A) encoded in the external handle. Otherwise, the external handle information (or the external handle itself if passed along to the requesting tenant) is invalidated at 610C, and the object entry structure or object entry array (e.g., 320 in FIG. 3B) may be scanned to identify a new handle for the object of interest at 612C. For example, a previous write operation may have created a new slot (rather than modifying one or more entries in the existing slot for the object) in the object entry array for the same object (e.g., metadata object) with a new slot index value and a new generation count value together with the change(s) made to the object. This new slot may be linked to the existing slot by using, for example, a pointer or a symbolic link within the same object entry array or in a separate data structure. In this example, the object entry array (or the separate data structure) may be scanned at 612C to identify the new handle. This new handle identified at 612C may then be sent to the requesting tenant at 614C.

Figure 7A:
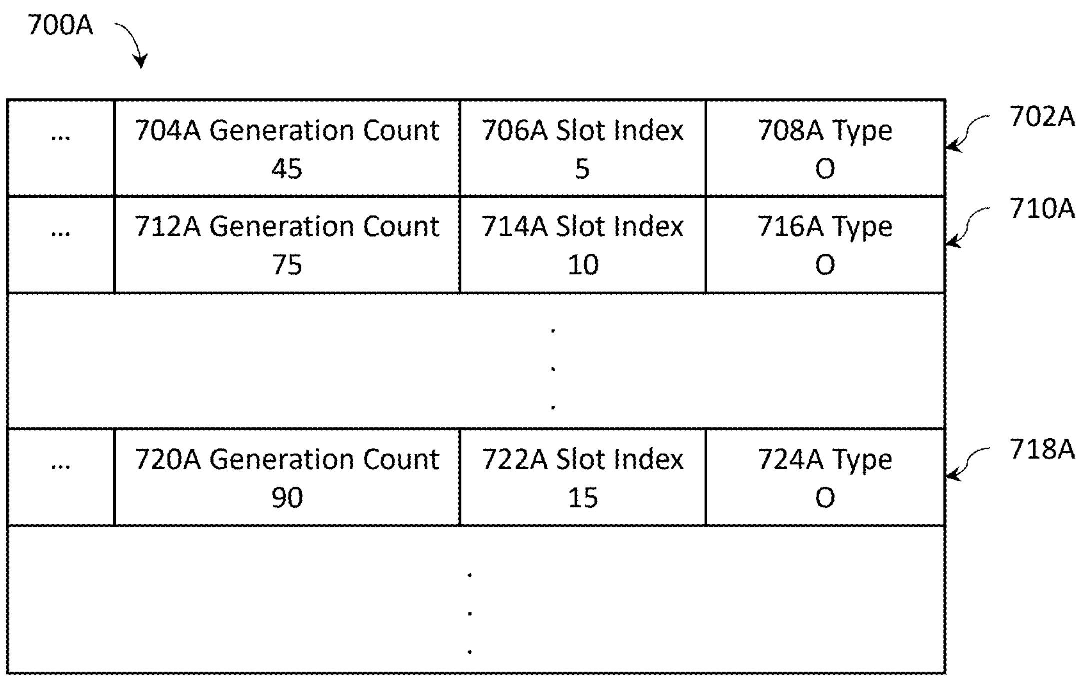
Figure 7A:
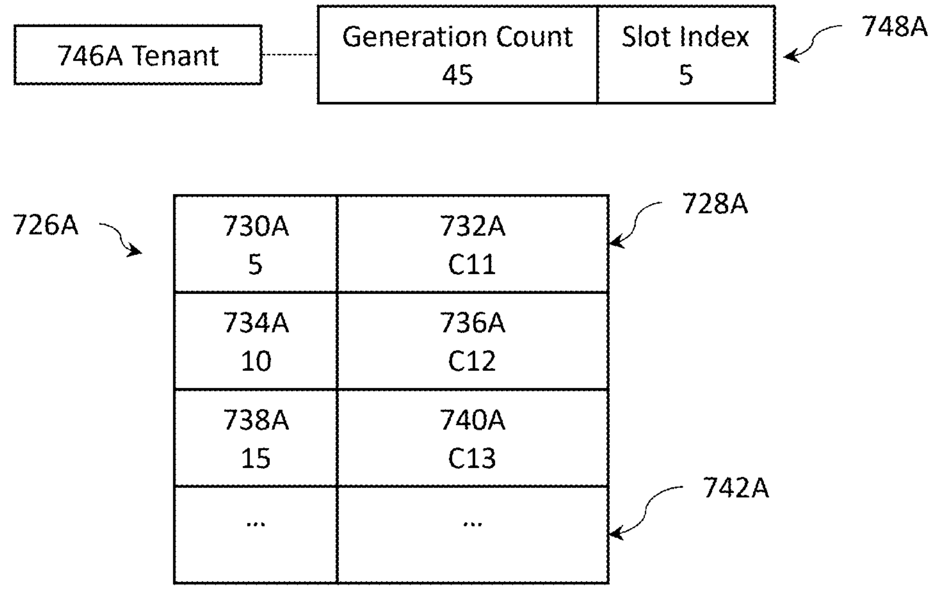

FIGS. 7A-7D illustrates an example of performing an operation (e.g., a read operation) with the metadata management described herein, according to some embodiments illustrated in reference numeral 108 of FIG. 1 and FIG. 6A and described above. FIG. 7A illustrates an object entry array 700A that includes a plurality of object entries or external handles such as 702A, 710A, 718A, etc. that respectively encode the corresponding internal handles comprising information such as the generation count value (704A, 712A, 720A, etc.), the slot index value (706A, 714A, 722A, etc.), and the access type (708A, 716A, 724A, etc.) shown in FIG. 7A. Each object entry or external handle encodes and comprises a plurality of entries. For example, external handle 702A encodes and comprises an internal handle that comprises a generation count value 704A of 45, a slot index value 706A of 5, and an access type value 708A of occupied or "O"; external handle 710A encodes and comprises an internal handle that comprises a generation count value 712A of 75, a slot index value 714A of 10, and an access type value 716A of occupied or "O"; and external handle 718A encodes and comprises an internal handle that comprises a generation count value 720A of 90, a slot index value 722A of 15, and an access type value 724A of occupied or "O". As described above, an external handle may also encode and comprise an object index value that is not shown for simplicity in FIG. 7A.

FIG. 7A further illustrates a tenant 746A in a multitenant environment that is made aware of some information or a client's handle 748A including information such as the generation count value of 45 and the slot index value of 5 pertaining to the external handle 702A. The tenant 746A may obtain the client's handle 748A from, for example, the tenant's last access to the metadata object whose access is controlled by using the external handle 702A. As it can be seen from the example illustrated in FIG. 7A, the client's handle 748A made aware to the tenant 746A is up to date because the generation count and slot index values are consistent with those of the external handle 702A.

FIG. 7A further illustrates a buffer array or structure 726A that stores a plurality of metadata objects which various tenants in the multitenant environment may need to access in order to access their respective, corresponding objects such as database objects. For the ease of illustration and description, the buffer array or structure 726A includes a plurality of sets of data where each set includes an index for a metadata object and the metadata object itself. For example, the buffer array or structure 726A includes a first column storing the respective index values of 5 (730A), 10 (734A), and 15 (738A) that respectively correspond to the slot index values 706A, 714A, and 722A in the object entry array or structure 700A. The buffer array or structure 726A further comprises a second column storing the metadata objects or links to the metadata objects 732A, 736A, and 740A that respectively correspond to the slot index values 730A, 734A, and 738A in the buffer array or structure 726A (and hence 706A, 714A, and 722A in the object entry array or structure 700A). In some embodiments, a buffer structure or array may also include one or more open, free slots 742A.

Figure 7B:
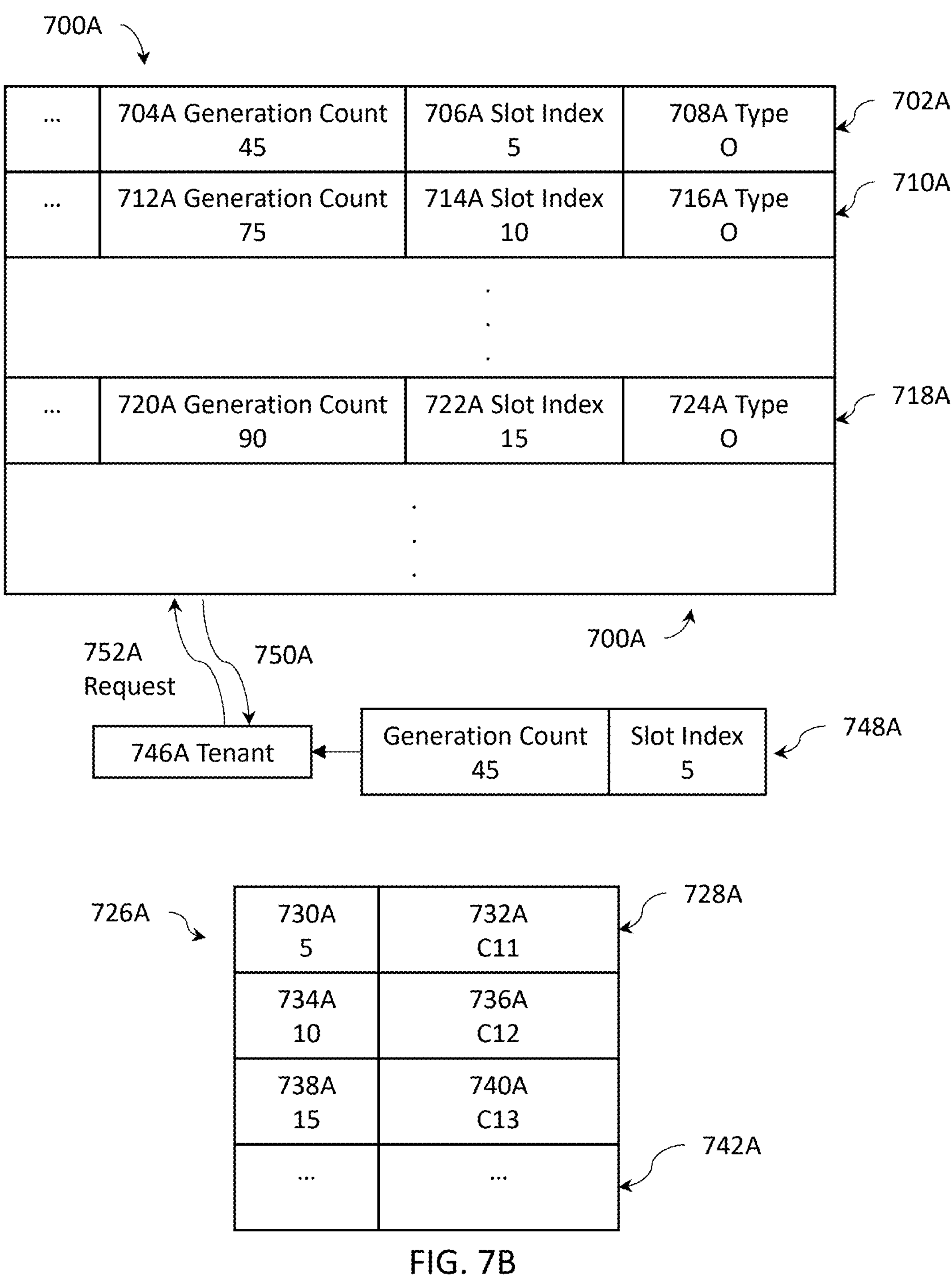

FIG. 7B continues from FIG. 7A and illustrates that the tenant 746A sends a request 752A to access a metadata object. In response to the tenant's request 752A, a pointer 728A to the object 732A or the object 732A itself may be returned and may be used to fulfill the request 752A with the techniques described herein to provide security to data in the multitenant environment. More specifically, the information of the client handle 748A is passed along with or included within the request to the receiving system (e.g., a metadata management system or platform) that performs a check to determine whether the tenant's handle 748A is still valid. For example, the tenant's handle 748A comprises the generation count value of 45 and the slot index value of 5 for the requested metadata object. These two values may be compared to the corresponding values in the object entry array 700A to determine whether the metadata object requested by the tenant request via 752A is up-to-date. More particularly, the slot index value having the value of five ("5") in the tenant's handle 748A may be compared to the slot index values in the object entry array 700A, and the external handle 702A whose slot index value 706A having the value of 5 matches that of the tenant's handle 748A.

In some embodiments, the matching slot index value may be identified by traversing an indexed or un-indexed object entry array or structure 700A while in some other embodiments, the external handle (702A in this example) may be identified by using an entry indicator or index value (e.g., 302 in FIG. 3A) that may be passed together with or in the tenant's request for accessing the metadata object of interest. The generation count value of 45 in the tenant's handle 748A may further be compared with the generation count value (704A in this example) of the internal handle encoded in the external handle 702A. In some embodiments, a pair or tuple including the slot index value and the generation count value in the tenant's handle 748A may be compared with the pair or tuple of the internal handle encoded in the external handle 702A while in some other embodiments, the slot index value and the generation count value in the tenant's handle 748A may be sequentially compared with the corresponding values in the internal handle encoded in the external handle 702A.

In this example, the slot index value and the generation count value in the tenant's handle 748A respectively match those in the external handle 702A. Matched generation count value and slot index value indicate that the requested object (e.g., metadata object) as expected by the requesting tenant is still up-to-date. As a result, the pointer 728A or the object 732A itself may be returned via 750A to the requesting tenant so that the requesting tenant may use the pointer 728A to access the object 732A.

Figure 7C:
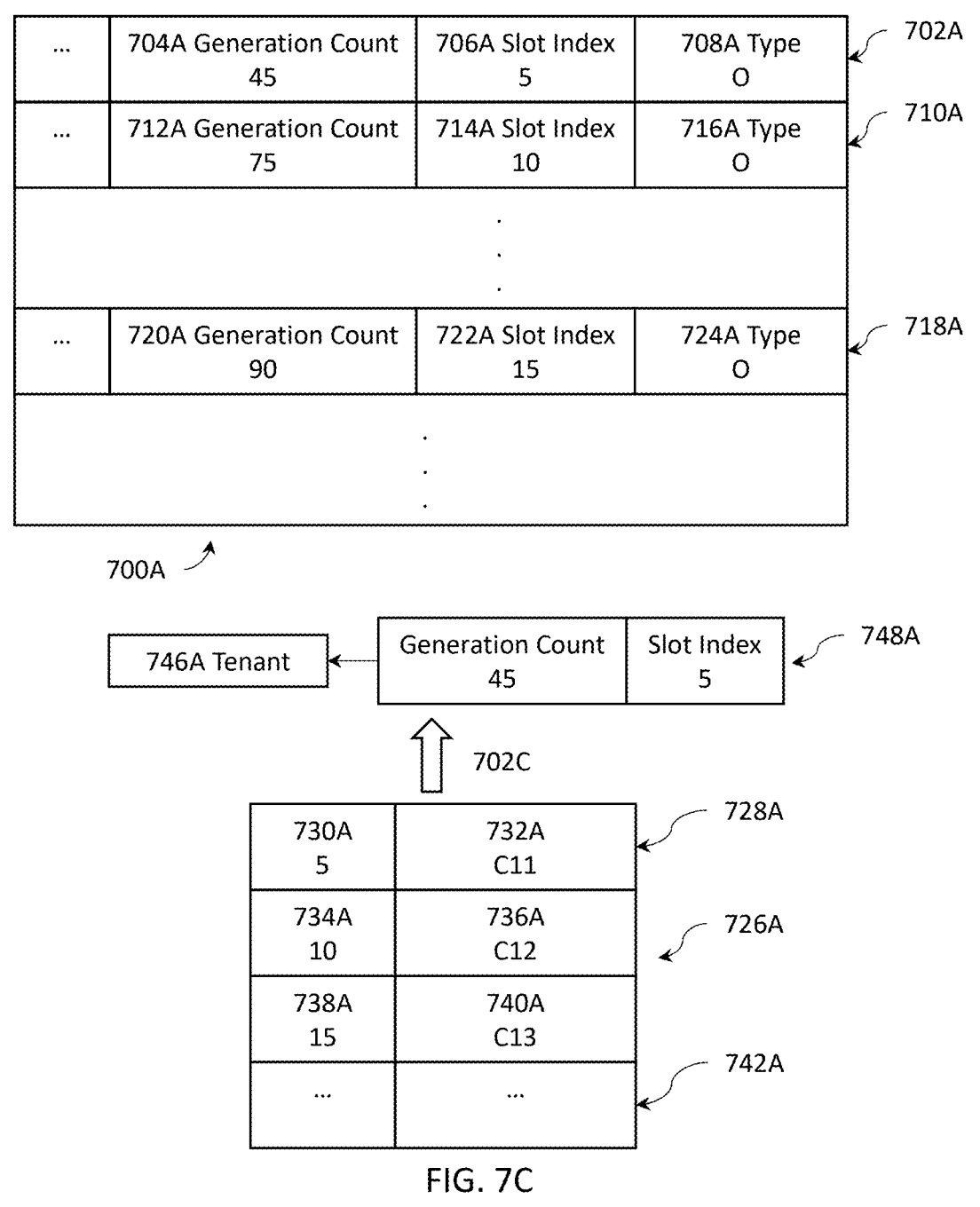

FIG. 7C continues from FIG. 7B and illustrates that upon successful validation that the tenant's handle is still valid, the requesting tenant may use the pointer 728A to access the object 732A with the corresponding slot index value and/or the generation count value where a copy of the object 732A may be sent (either via pulling by the requesting tenant or pushing from the server) to the requesting tenant's memory.

Figure 7D:
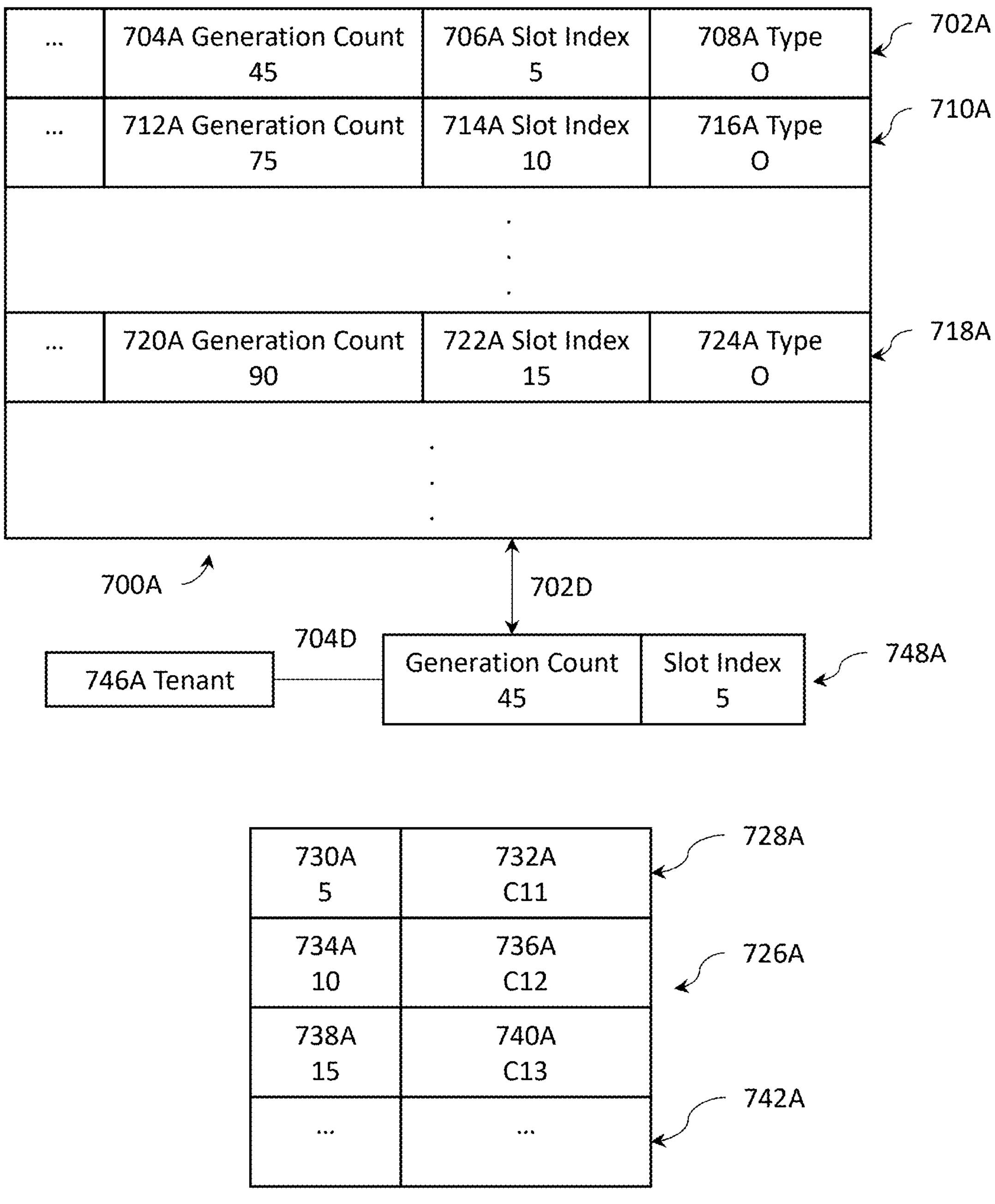

FIG. 7D continues from FIG. 7C and illustrates that at or near the end of the access request (e.g., a request for a read operation for the object 732A in this example), the requesting tenant accesses its tenant handle via 704D and sends its slot index value and generation count value to the server to further check, via 702D, whether the requesting tenant's handle 748A is still valid. This additional check is to ensure that the requested object (732A in this example) has not changed from the time the tenant's handle is validated to the time the read operation is complete. If the information in the tenant's handle is again validated or verified to be consistent with those in the object entry structure or array 700A, no further operations need to be performed.

On the other hand, if this additional check reveals that the tenant's handle having the slot index value of 5 and the generation count value of 45 is no longer valid due to, for example, another update to the object 732A that changes at least the generation count value (when the external handle 702A is modified) or both the generation count value and the slot index value (when a new external handle is generated for the modification of the object 732A as described above). In this case, although the tenant's handle remains unchanged, the tenant's handle is no longer valid as revealed by this additional check, and the requesting tenant thus needs to restart the read operation in order to access the latest object 732A. In some embodiments, restarting the read request may be programmatically performed by the server. In some of these embodiments, the server may notify, via 702D, the requesting tenant of restarting the read request. In some other embodiments, the server may notify, via 702D, the requesting tenant that the previous read may be directed to an outdated object with a new generation count value and/or a new slot index value. The tenant may then use the updated information and issue another read request for the object 732A via 702D.

Figure 8A:
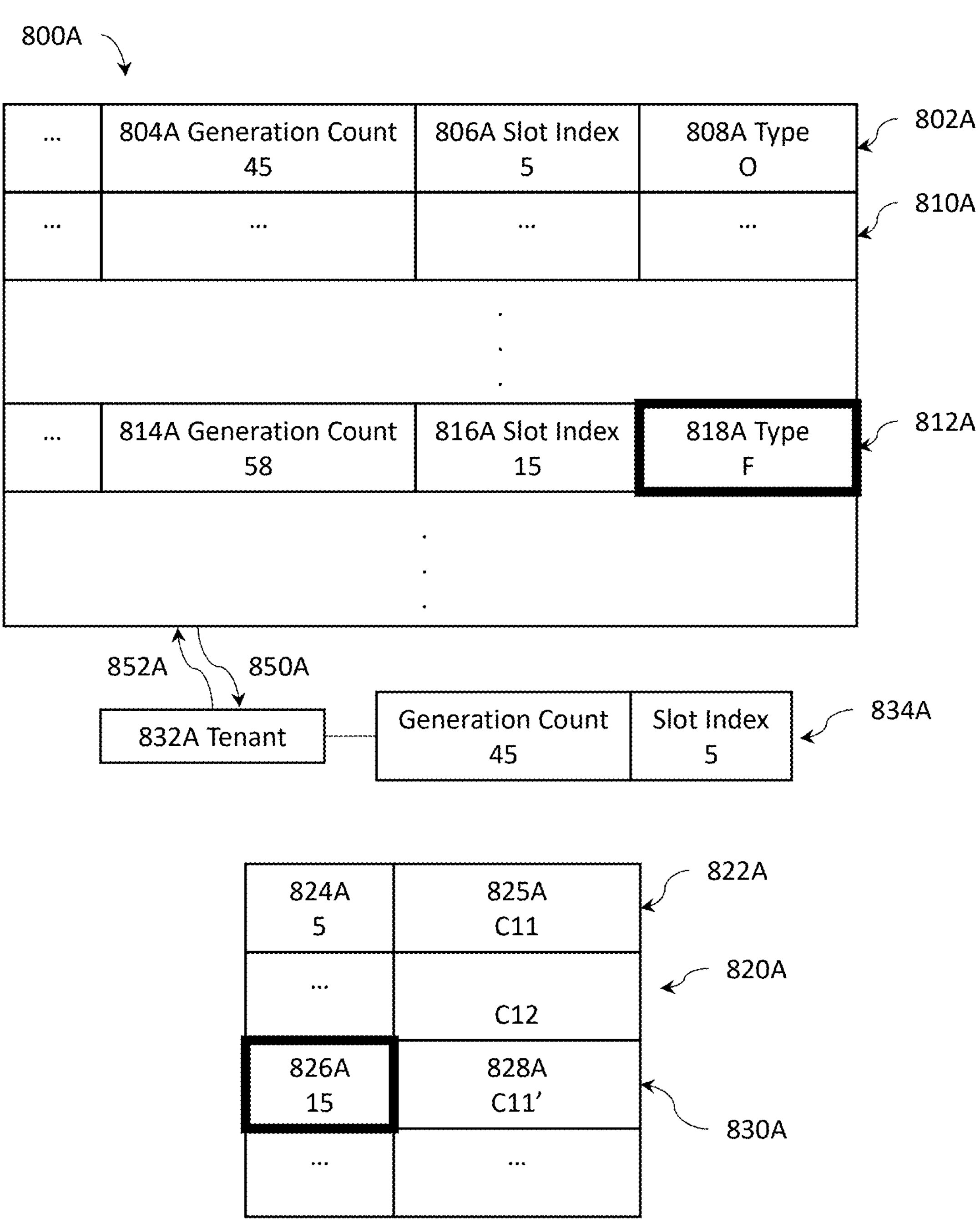
FIGS. 8A-8D illustrates an example of performing a write operation with the metadata management described herein, according to some embodiments.

FIGS. 8A-8D illustrates an example of performing an operation (e.g., a write operation) with the metadata management described herein, according to some embodiments illustrated in reference numeral 108 of FIG. 1 and FIG. 6B and described above. FIG. 8A illustrates an object entry array 800A that includes a plurality of object entries or external handles such as 802A, 810A, 812A, etc. that respectively encode the corresponding internal handles comprising information such as the generation count value (804A, 814A, etc.), the slot index value (806A, 816A, etc.), and the access type (808A, 818A, etc.) shown in FIG. 8A.

In this example illustrated in FIGS. 8A-8D, a tenant sends an access request for performing a write operation on an object of interest. Moreover, this example further illustrates some embodiments where the write operation is not performed on existing entries of an existing handle (e.g., 802A) for the object of interest. Rather, a set of new entries (e.g., for external handle 812A) is created by obtaining the next available generation count value 814A ("58" in this example) and a new slot index value 816A ("15" in this example).

Each object entry or external handle encodes and comprises a plurality of entries. For example, external handle 802A encodes and comprises an internal handle that comprises a generation count value 804A of 45, a slot index value 806A of 5, and an access type value 808A of occupied or "O"; external handle 810A encodes and comprises its internal handle that comprises the corresponding generation count value, a slot index value, and an access type value; and external handle 812A encodes and comprises an internal handle that comprises a generation count value 814A of 58 (which is the next available generation count value), a slot index value 816A of 15, and an access type value 818A of free or "F" that indicates that this external handle 812A is open to occupancy. As described above, an external handle may also encode and comprise an object index value that is not shown for simplicity in FIG. 8A.

FIG. 8A further illustrates a tenant 832A in a multitenant environment that is made aware of some information or a client's handle 834A such as the generation count value of 45 and the slot index value of 5 pertaining to the external handle 802A. The tenant 832A may obtain the tenant's handle 834A from, for example, the tenant's last access to the metadata object whose access is controlled by using the external handle 802A. As it can be seen from the example illustrated in FIG. 8A, the tenant's handle 834A made aware to the tenant 832A is up to date because the generation count and slot index values are consistent with those of the external handle 802A.

FIG. 8A further illustrates a buffer array or structure 820A that stores a plurality of objects (e.g., metadata objects) or a plurality of references therefor which various tenants in the multitenant environment may need to access in order to access their respective, corresponding objects such as database objects. For the ease of illustration and description, the buffer array or structure 820A includes a plurality of sets or rows of data where each set or row includes an index (e.g., slot index) for a metadata object and the metadata object itself. For example, the buffer array or structure 820A includes a first column storing the respective slot index values of 5 (824A) and 15 (826A) that respectively correspond to the slot index values 806A and 816A in the object entry array or structure 800A. The buffer array or structure 820A further comprises a second column storing the metadata objects or links to the metadata objects 822A and 830A that respectively correspond to the slot index values 806A and 816A in the object entry array or structure 800A. In some embodiments, a buffer structure or array 820A may also include one or more open, free, or unoccupied slots.

The tenant 832A sends a request 852A to access an object (e.g., object C11 825A). In the example of a tenant's request for a request for a read operation illustrated in FIGS. 7A-7D, in response to the tenant's request 852A, a pointer 822A to the object 825A in the buffer structure or array 802A may be returned to fulfill the request 852A with the techniques described herein to provide security to data in the multitenant environment. For a request for a read operation, the information of the client handle 834A is passed along with or included within the request to the receiving system (e.g., a metadata management system or platform) that performs a check to determine whether the tenant's handle 834A is still valid. For example, the tenant's handle 834A comprises the generation count value of 45 and the slot index value of 5 for the requested metadata object. These two values may be compared to the corresponding values in the object entry array 800A to determine whether the metadata object requested by the tenant request via 852A is up-to-date. More particularly, the slot index value in the tenant's handle 834A may be compared to the slot index values in the object entry array 800A, and the external handle 802A whose slot index value 806A having the slot index value of 5 matches that of the tenant's handle 834A.

In this example request for a read operation illustrated in FIG. 8A, the tenant's request 852A is to modify an object (e.g., 825A) via the tenant's request 852A with a write operation with respect to an object (e.g., 825A to be determined by the pointer 822A). Nonetheless, FIG. 8A illustrates an example where the write operation is not to be performed on existing entries of an existing handle (e.g., 802A) for the object of interest despite the fact that the slot index value (806A) and the generation count value (804A) match the corresponding values in the tenant's handle 834A in this example. Rather, a set of new entry values (e.g., for external handle 812A) is created for the new entries by obtaining the next available generation count value 814A ("58" in this example) and a new slot index value 816A ("15" in this example). This creating a new external handle 812A may be performed when, for example, the write operation modifies a plurality of values pertaining to the object of interest and exceeding a threshold number of values for modification in some embodiments. Whether a write operation is to be performed on an existing entry (e.g., 802A) in an object entry structure or array 800A or a new entry or external handle (e.g., 812A) is to be generated may be a user's choice in some embodiments or may be programmatically determined and performed in some other embodiments.

In some embodiments, the matching slot index value may be identified by traversing an indexed or un-indexed object entry array or structure 800A while in some other embodiments, the external handle (802A in this example) may be identified by using an entry indicator or index value (e.g., 302 in FIG. 3A) that may be passed together with or in the tenant's request for accessing the metadata object of interest. The generation count value of 45 in the tenant's handle 834A may further be compared with the generation count value (804A in this example) of the external handle 802A. In some embodiments, a pair including the slot index value and the generation count value in the tenant's handle 834A may be compared with pair of the external handle 802A while in some other embodiments, the slot index value and the generation count value in the tenant's handle 834A may be sequentially compared with the corresponding values in the external handle 802A.

In this example, the slot index value and the generation count value in the tenant's handle 834A respectively match those in the external handle 802A. Matched generation count value and slot index value indicate that the requested object as expected by the requesting tenant is still up-to-date. As a result, the pointer 822A may be returned via 850A to the requesting tenant so that the requesting tenant 832A may use the pointer 822A to access the object 825A.

FIG. 8A further illustrates a buffer array or structure 820A that stores a plurality of metadata objects which various tenants in the multitenant environment may need to access (e.g., modify). Once the tenant's handle is validated as currently valid as described above, the requesting tenant 832A may use the pointer 830A that identifies a free slot in the buffer array or structure 820A to facilitate the write operation that is to be performed on object 825A yet the results are saved to the new slot. For the ease of illustration and description, the buffer array or structure 820A includes a plurality of sets or rows of data where each set includes an index for a metadata object and the metadata object itself.

For example, the buffer array or structure 820A includes a first column storing the respective slot index values of 5 (824A) as well as 15 (826A) upon a successful creation of a new object by populating the value(s) associated with the write operation and the other unchanged value(s) of object 825A. The buffer array or structure 820A further comprises a second column storing the metadata objects (that respectively describe corresponding objects such as database objects stored in a database) or links to the metadata objects 825A as well as 828A upon a successful creation of a new object by populating the entry value(s) from the write operation and the other unchanged entry value(s) from object 825A. In some embodiments, a buffer structure or array 820A may also include one or more open, free slots. Again, a write operation may modify an existing entry via the pointer 822A in the buffer array or structure 820A in some embodiments or may create a new entry having a plurality of entry values (e.g., 824A and 825A for the first entry, 826A and 828A for the third entry, etc.) in some other embodiments.

Figure 8B:
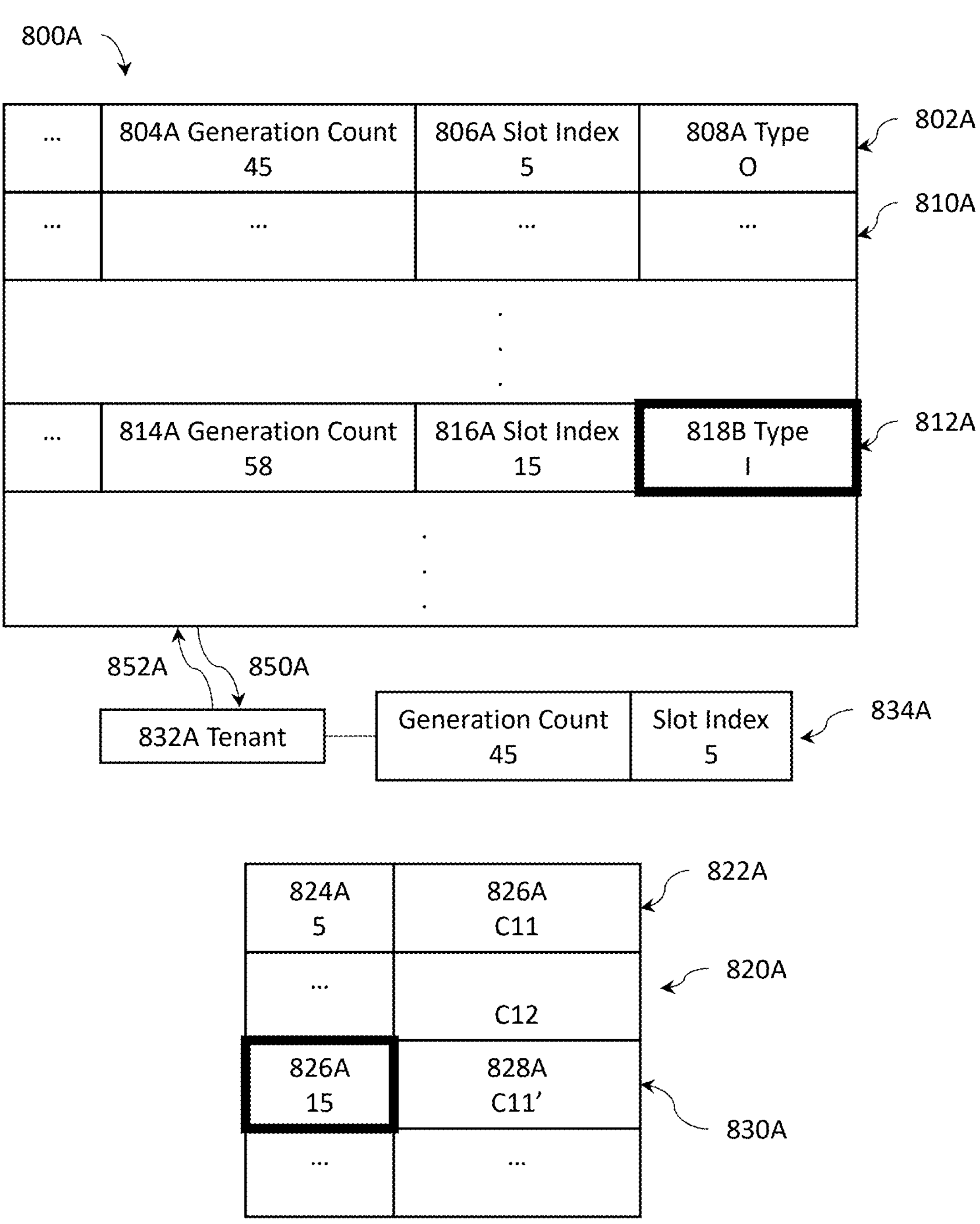

FIG. 8B continues from FIG. 8A and illustrates further operations in response to the access request 852A (e.g., an access request for a write operation on an object corresponding to the tenant's handle 834A). More specifically, the free entry 812A identified above may be first updated to alter the access type 818A from free or "F" to in-progress or "I" so that this entry 812A (which has the free or "F" access type 818A) will not be acquired by another request. The access type 818A "I" indicates that update is currently in progress and prevents this entry 812A from being acquired by another process.

The external handle or entry 812A may further be populated with, for example, the next available generation count value 814A of 58 from, for example, a sequence of monotonically increasing generation count or sequence count values and an available slot index value 816A of 15, etc. In some embodiments, all existing values from an existing external handle (e.g., 802A) may be populated into a new external handle (e.g., 812A), and the update(s) from the write operation may then be applied to the corresponding field(s) for the new external handle. In some other embodiments, only existing value(s) that does not change by the write operation may be populated from an existing external handle (e.g., 802A) into the new external handle (e.g., 812A), and the update(s) from the write operation may then be applied to the non-populated or empty field(s) for the new external handle.

Figure 8C:
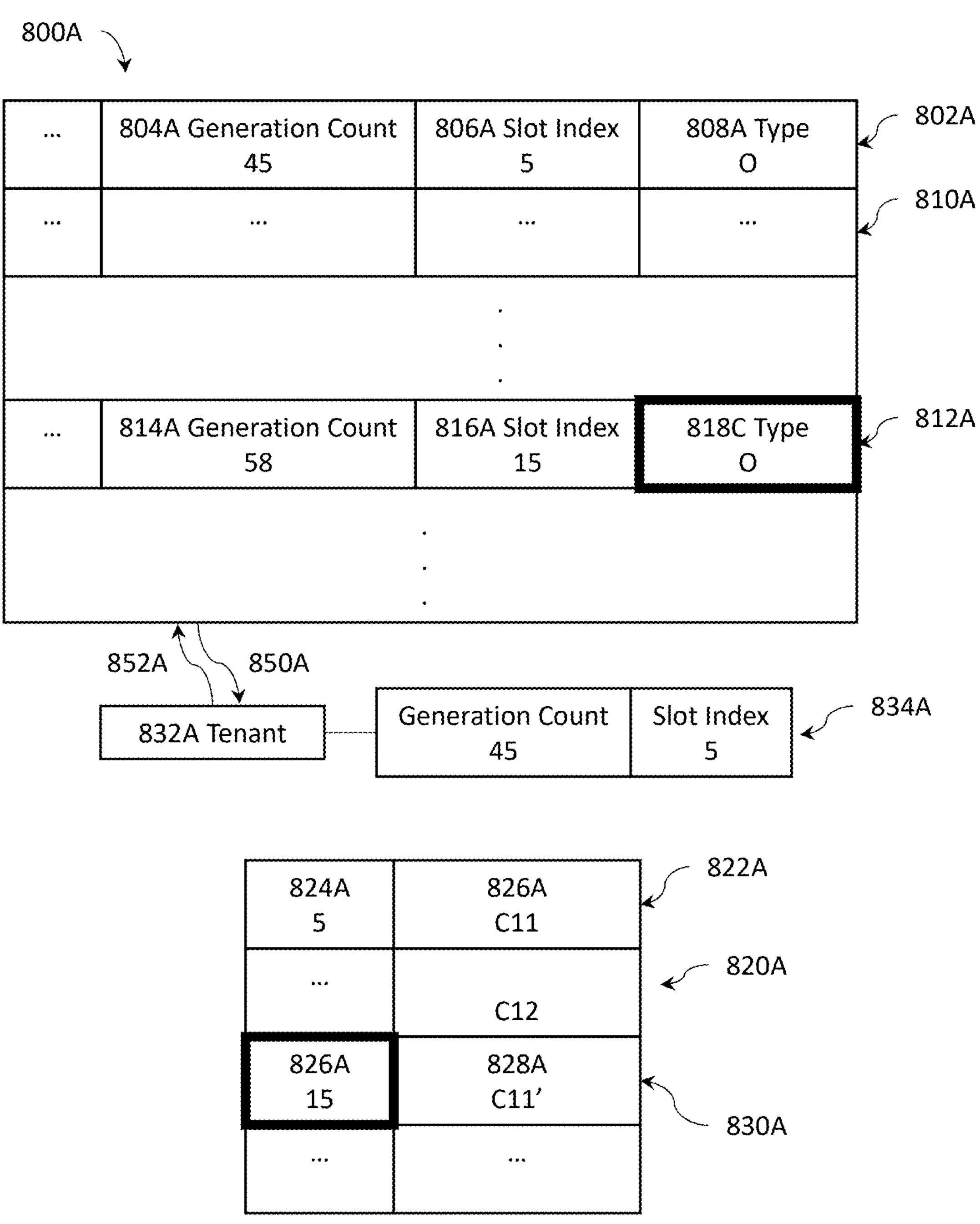

FIG. 8C continues from FIG. 8B and illustrates that once the write operation is completed, the changes to the object 828A may then be committed by saving the records of a database to which the object 828A pertains in a persistent storage such as a persistent disk drive or a persistent memory. Committing the changes to the object 828A may be a part of an atomic operation that includes not only committing the changes to the object 828A but also persistently storing various log records (e.g., undo log records, redo log records, etc.) and more importantly, updating the external handle. For example, the value "O" of access type 818C may be altered from in-progress or "I" to occupied or "O" that indicates that the external handle 812A is no longer undergoing updates and is actually been used for an external handle for an object. In some embodiments, the access type 818C is changed from in-progress to occupied after the changes for object 828A are committed although this order may be reversed (changing the access type 818C before committing the changes for 828A) in some other embodiments.

Figure 8D:
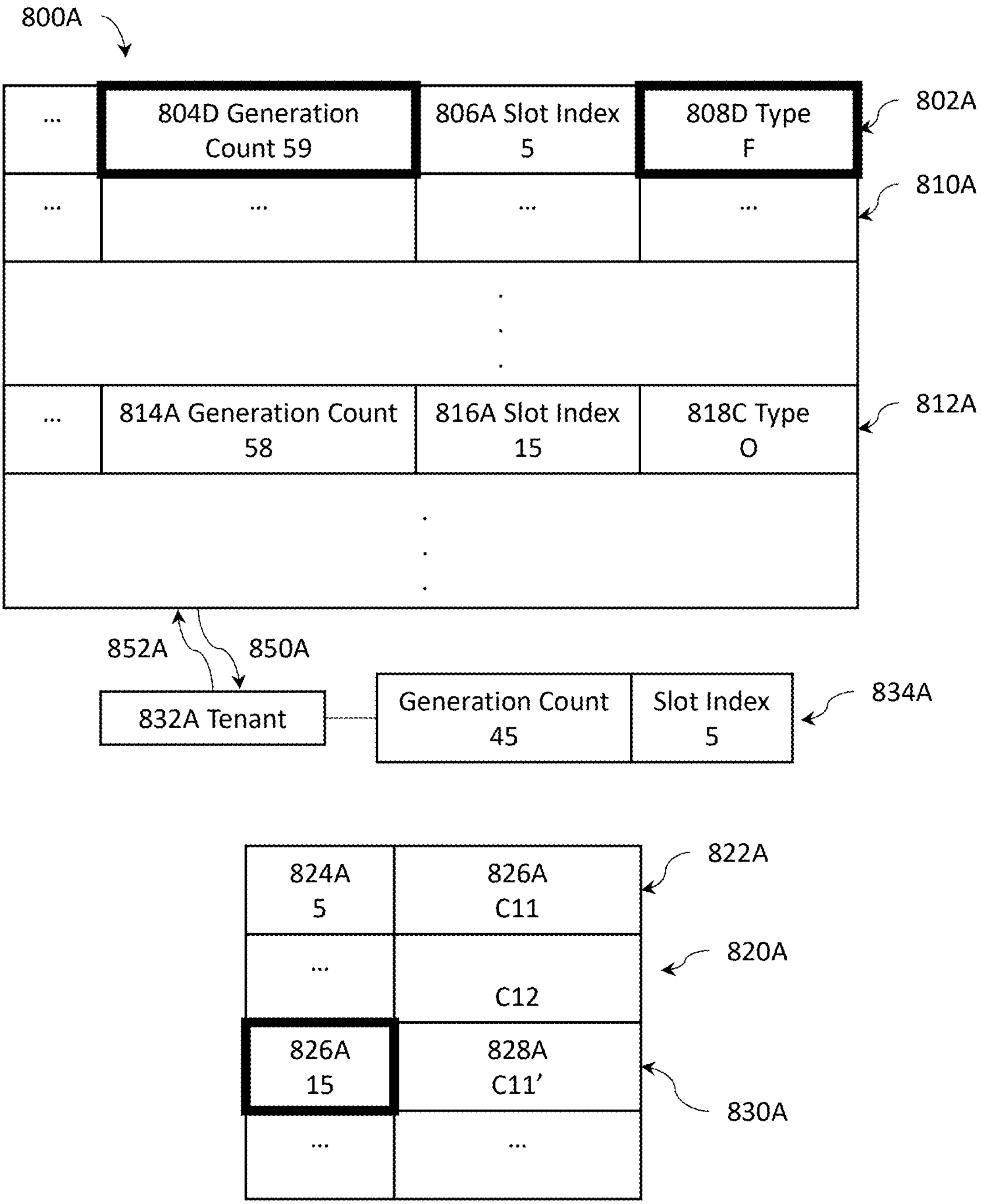

The aforementioned atomic operation may further include changing (e.g., incrementing) the generation count value in the object entry structure or array 800A, if needed in some embodiments. In this example illustrated in FIGS. 8A-8D, a new external handle 812A is created for the write operation performed on the object corresponding to the external handle 802A so the generation count value may be determined by obtaining the next available generation count value ("58" in this example) when or shortly after the new external handle 812A is created so no further update may be needed. If the generation count value for the new external handle 812A is somehow not set, this generation count value 814A may be determined from the next available generation count value as a part of the aforementioned atomic operation. In some embodiments, the aforementioned atomic operation may further include changing the value of the access type 808C from occupied or "O" in 808A to free or "F" in 808C as illustrated in FIG. 8D. In some embodiment, the aforementioned atomic operation may also include changing the value of the generation count 804D from the value of 45 in 804A to 59 (assuming 59 is the next available generation count value) in 804D as illustrated in FIG. 8D.

Figure 9A:
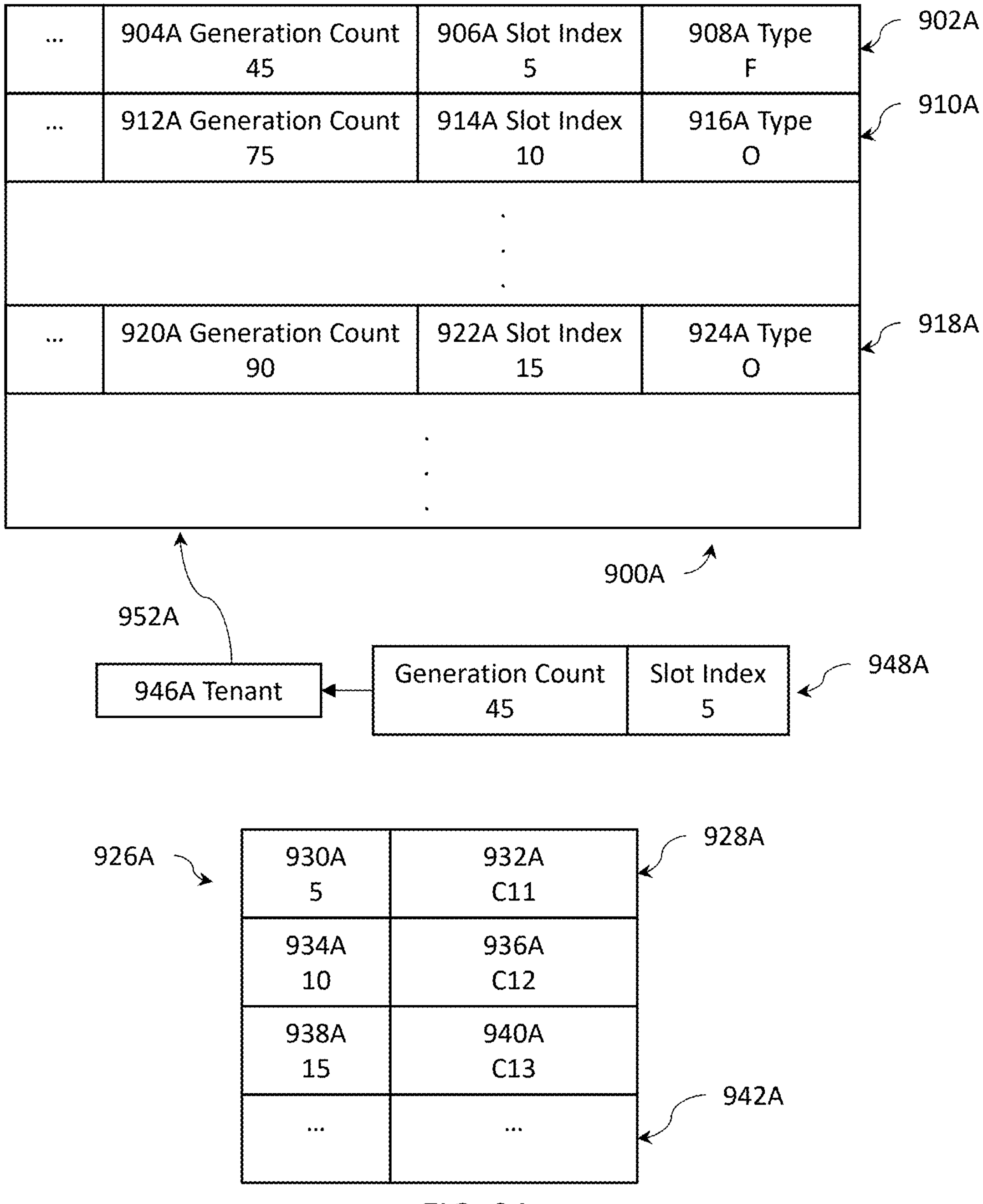
FIG. 9A-9F illustrate an example of the block diagram of FIG. 6C, according to some embodiments.

FIG. 9A-9F illustrate an example of the block diagram of FIG. 6C, according to some embodiments illustrated in reference numeral 108 of FIG. 1 and FIGS. 6B and 8A-8D and described above. FIG. 9A illustrates an object entry array 900A that includes a plurality of object entries or external handles such as 902A, 910A, 918A, etc. that respectively encode the corresponding internal handles respectively comprising information such as the generation count value (904A, 912A, 920A, etc.), the slot index value (906A, 914A, 922A, etc.), and the access type (908A, 916A, 924A, etc.) shown in FIG. 9A.

Each object entry or external handle encodes and comprises a plurality of entries. For example, external handle 902A encodes and comprises an internal handle that comprises a generation count value 904A of 45, a slot index value 906A of 5, and an access type value 908A of occupied or "O"; external handle 910A encodes and comprises an internal handle that comprises a generation count value 912A of 75, a slot index value 914A of 10, and an access type value 916A of occupied or "O"; and external handle 918A encodes and comprises an internal handle that comprises a generation count value 920A of 90, a slot index value 922A of 15, and an access type value 924A of occupied or "O". As described above, an external handle may also encode and comprise an object index value that is not shown for simplicity in FIG. 9A.

FIG. 9A further illustrates a tenant 946A in a multitenant environment that is made aware of some information or a client's handle 948A such as the generation count value of 45 and the slot index value of 5 pertaining to the external handle 902A that is used to control access to an object (e.g., object 932A or object corresponding to the link 932A). The tenant 946A may obtain the client's handle 948A from, for example, the tenant's last access to the metadata object whose access is controlled by using the external handle 902A. As it can be seen from the example illustrated in FIG. 9A, the client's handle 948A made aware to the tenant 946A is up-to-date because the generation count and slot index values are consistent with those of the external handle 902A.

FIG. 9A further illustrates a buffer array or structure 926A that stores a plurality of objects (e.g., metadata objects) which various tenants in the multitenant environment may need to access in order to access their respective, corresponding objects such as database objects. For the ease of illustration and description, the buffer array or structure 926A includes a plurality of sets of data where each set includes an index for an object and the object itself. For example, the buffer array or structure 926A includes a first column storing the respective slot index values of 5 (930A), 10 (934A), and 15 (938A) that respectively correspond to the slot index values 906A, 914A, and 922A in the object entry array or structure 900A. The buffer array or structure 926A further comprises a second column storing the objects or links to the objects 932A, 936A, and 940A that respectively correspond to the slot index values 930A, 934A, and 938A in the buffer array or structure 926A (and hence 906A, 914A, and 922A in the object entry array or structure 900A). In some embodiments, a buffer structure or array may also include one or more open, free slots 942A.

FIG. 9A further illustrates that the tenant 946A sends a request 952A to access (e.g., read or write) a metadata object. In response to the tenant's request 952A, a pointer 928A to the object 932A may be returned and may be used to fulfill the request 952A with the techniques described herein to provide security to data in the multitenant environment. More specifically, the information of the client handle 948A is passed along with or included within the request to the receiving system (e.g., a metadata management system or platform) that performs a check to determine whether the tenant's handle 948A is still valid. For example, the tenant's handle 948A comprises the generation count value of 45 and the slot index value of 5 for the requested metadata object. These two values may be compared to the corresponding values in the object entry array 900A to determine whether the metadata object requested by the tenant request via 952A is still valid (e.g., whether the requested object is up-to-date). More particularly, the slot index value in the tenant's handle 948A may be compared to the slot index values in the object entry array 900A, and the external handle 902A whose slot index value 906A having the slot index value of 5 matches that of the tenant's handle 948A.

In some embodiments, the matching slot index value may be identified by traversing an indexed or un-indexed object entry array or structure 900A while in some other embodiments, the external handle (902A in this example) may be identified by using an entry indicator or index value (e.g., 302 in FIG. 3A) that may be passed together with or in the tenant's request for accessing the metadata object of interest. The generation count value of 45 in the tenant's handle 948A may further be compared with the generation count value (904A in this example) of the external handle 902A. In some embodiments, a pair including the slot index value and the generation count value in the tenant's handle 948A may be compared with pair of the external handle 902A while in some other embodiments, the slot index value and the generation count value in the tenant's handle 948A may be sequentially compared with the corresponding values in the external handle 902A.

In this example, the slot index value and the generation count value in the tenant's handle 948A respectively match those in the external handle 902A. Matched generation count value and slot index value indicate that the requested object as expected by the requesting tenant is still up-to-date. As a result, the pointer 928A may be returned via 950A to the requesting tenant so that the requesting tenant may use the pointer 928A to access the object 932A.

Figure 9B:
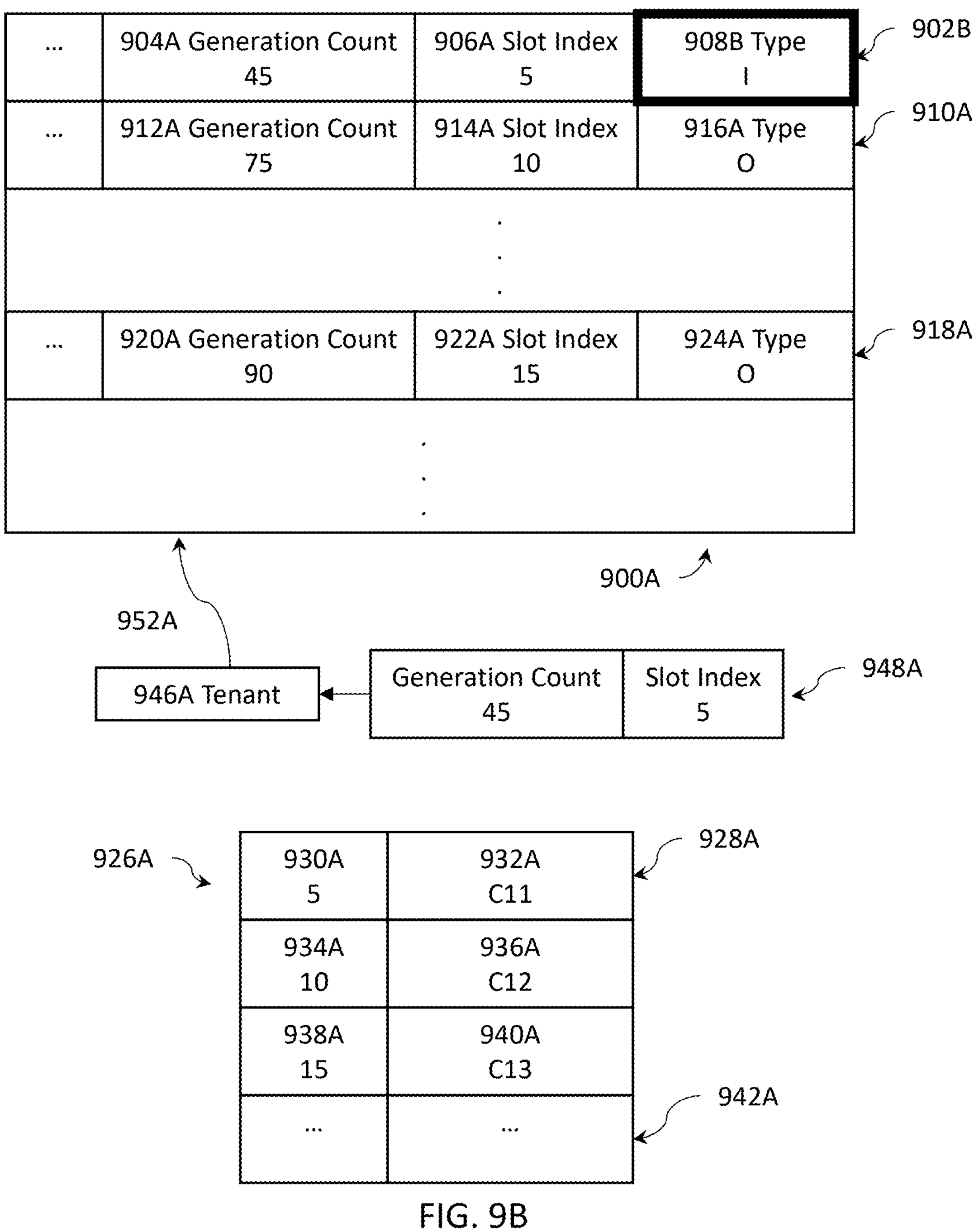

FIG. 9B continues from FIG. 9A where the tenant's request 952A is to modify an object. In these embodiments, the access type value is changed from occupied or "O" in 908A to in-progress or "I" in 908B. The write operation associated with the tenant's request 952A may be performed on the object of interest that may be identified as described herein. The access type value "I" 908B prevents the external handle 902A from being acquired by another process or tenant. In some embodiments where the write operation is to modify an existing external handle, the generation count value may further be updated from the current generation count value 904A of 45 in FIG. 9B into the updated generation count value 904C of 91 for the external handle 902C in FIG. 9C (assuming the value of 91 is the next available value for the generation count values).

Figure 9C:
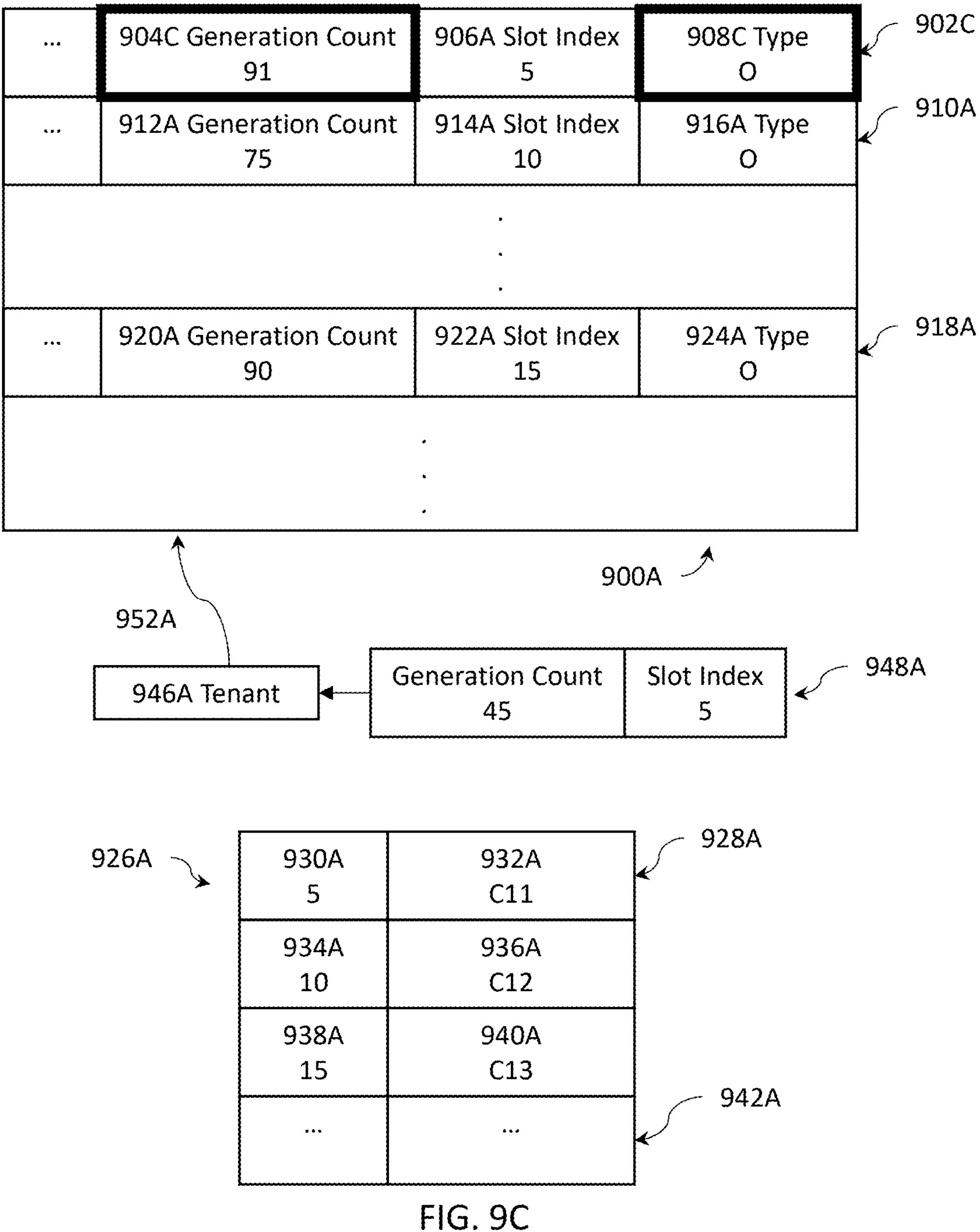
Figure 9D:
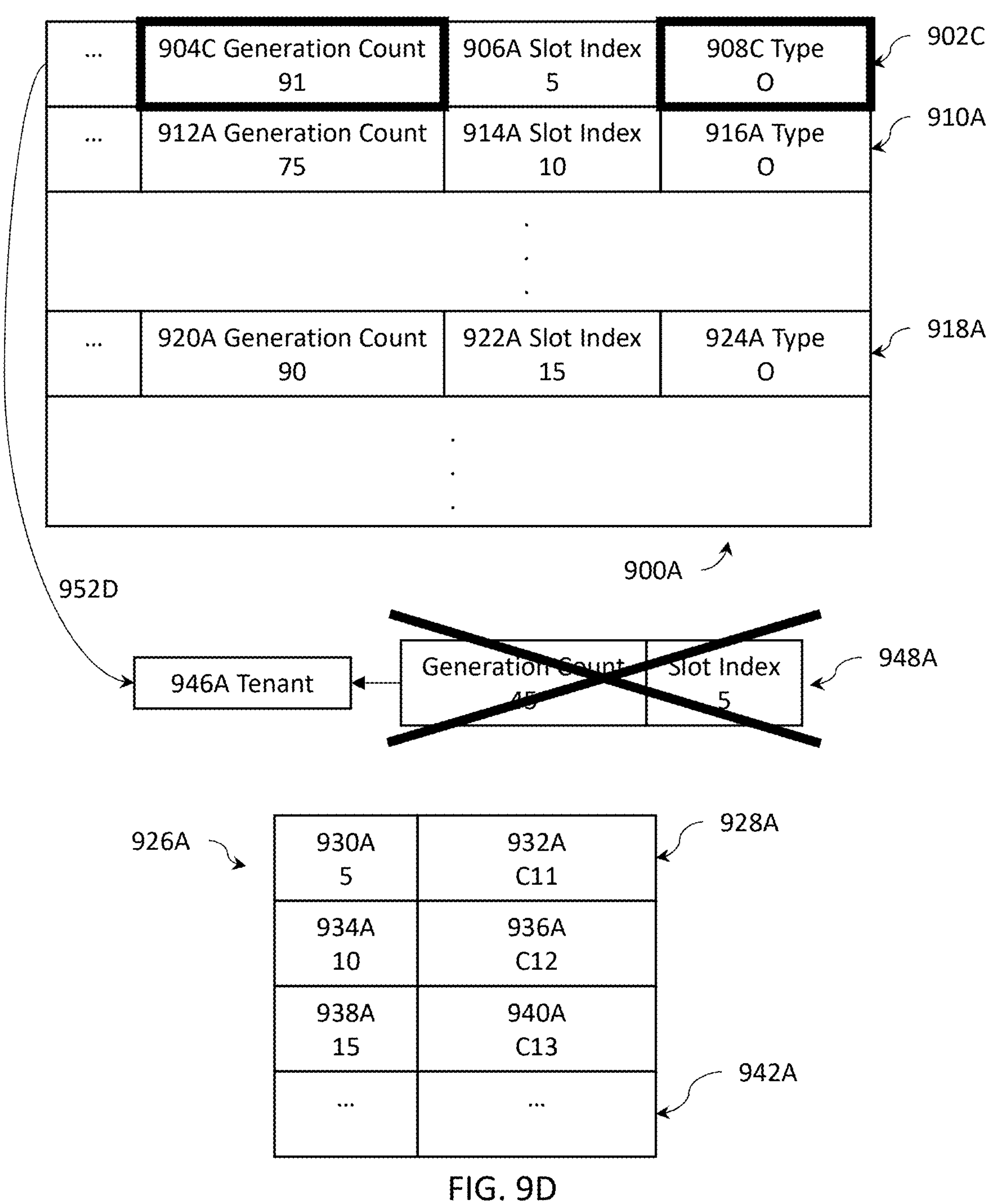
Figure 9E:
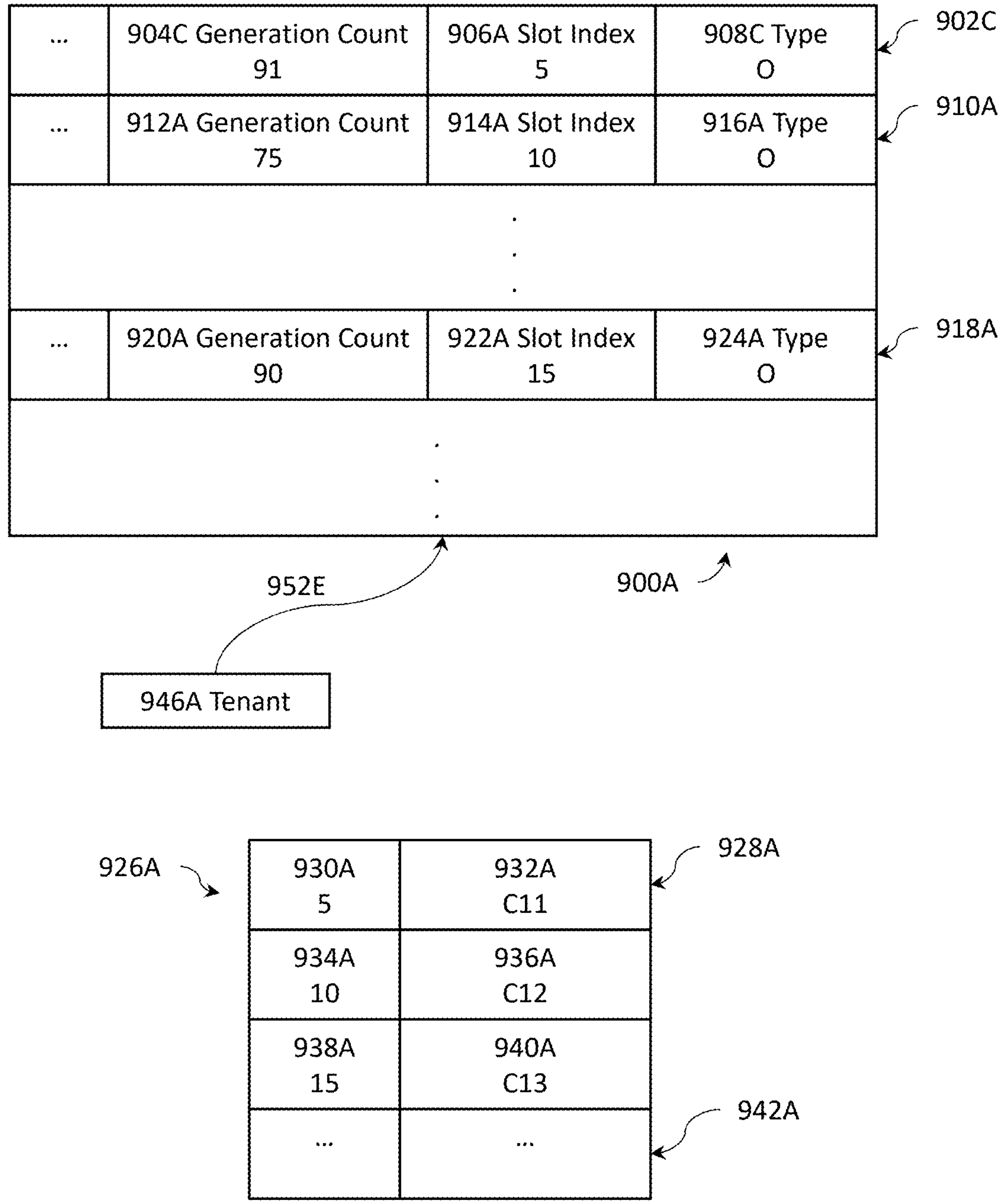
Figure 9F:
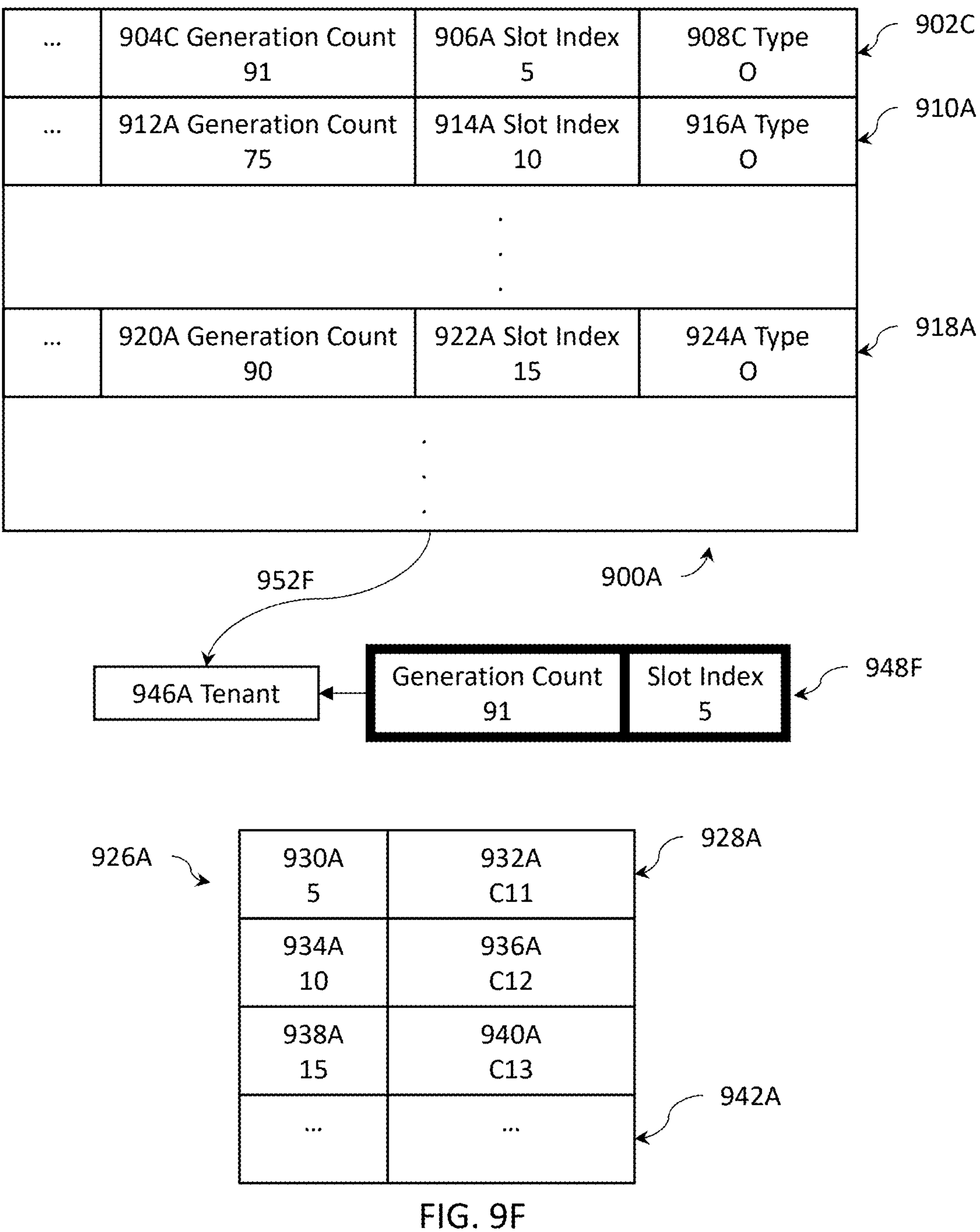

In some embodiments, the generation count 904C is updated as a result of the write operation. As a result, the server may send an invalidation request or an instruction 952D to invalidate the current tenant's handle 948A as shown in FIG. 9D because the information in the current tenant's handle 948A no longer points to the up-to-date object. In some embodiments, the invalidation may follow upon or shortly after the update to the external handle 902A as illustrated in FIG. 9C so the tenant 946A may be left with no tenant's handle as shown in FIG. 9E. In these embodiments, the tenant 946A may send a request 952E for the object by using, for example, the object entry (e.g., an entry index 302 corresponding to the object of interest in FIG. 3A) to the server that hosts or has access to the object entry structure or array 900A.

In some other embodiments, the invalidation of the then-current tenant's handle 948A may occur when the tenant 946A again sends a request 952E for an operation on the same object in the future. In these latter embodiments, tenant 946A will continue to hold the tenant's handle 948A until the tenant 946A attempts to access the same object in the future, and the server may, upon the receipt of the future request, sends the invalidation 952D. In these embodiments, the request 952E may be sent together with information (which has been outdated due to the write operation) in the tenant's handle 948A.

Updated information pertaining to the up-to-date external handle 902C may be forwarded to the tenant 946A via 952F so that the tenant 946A may access the corresponding up-to-date object using the updated tenant's handle 948F that comprises the up-to-date generation count value of 91 and the slot index value of 5 that matches the corresponding values for the up-to-date external handle 902C.

Therefore, what has been described is an improved approach to management hierarchical metadata objects for a database.

SYSTEM ARCHITECTURE

Figure 10:
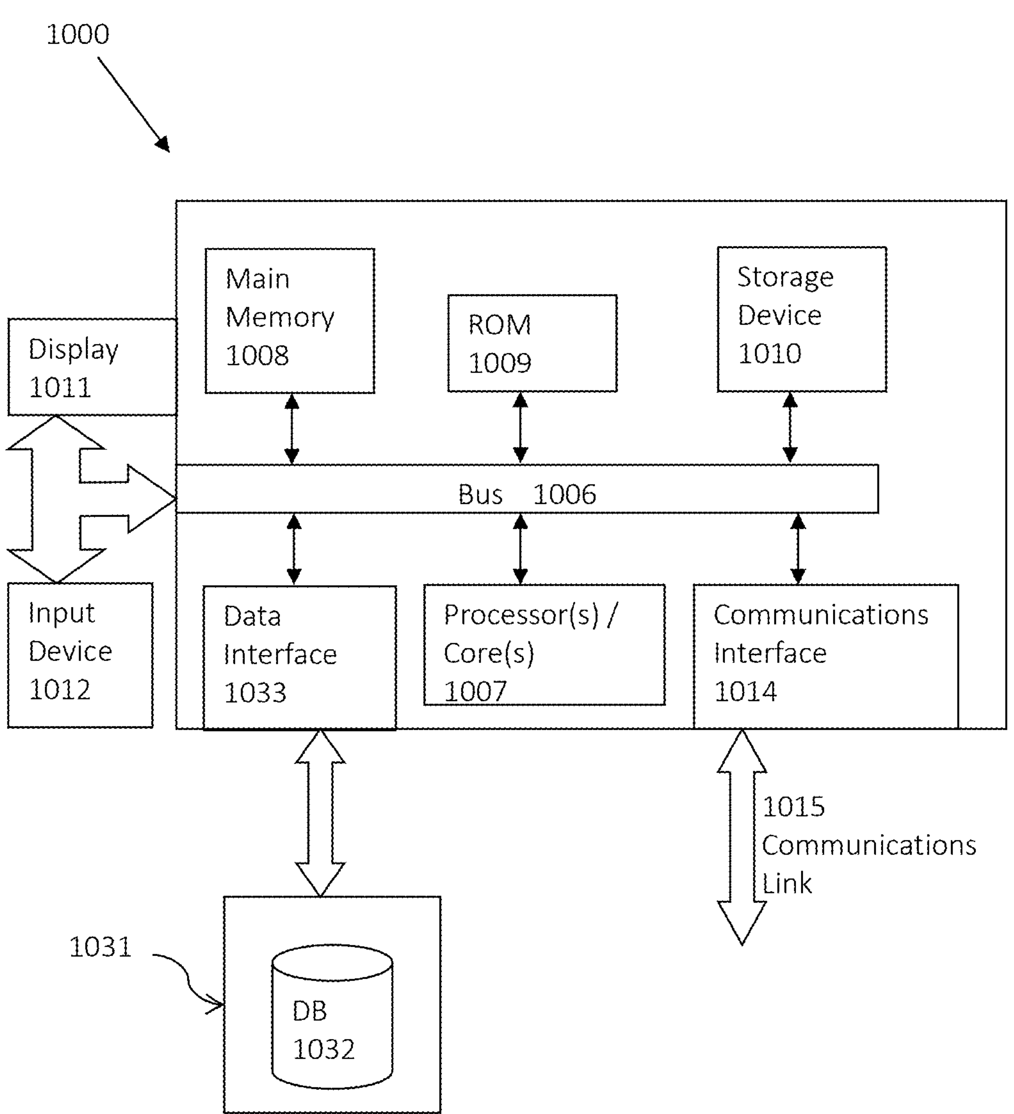
FIG. 10 illustrates an example block diagram of one or more components of a system environment for implementing metadata management, in accordance with some embodiments.

FIG. 10 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control.

According to some embodiments of the invention, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1010 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 11:
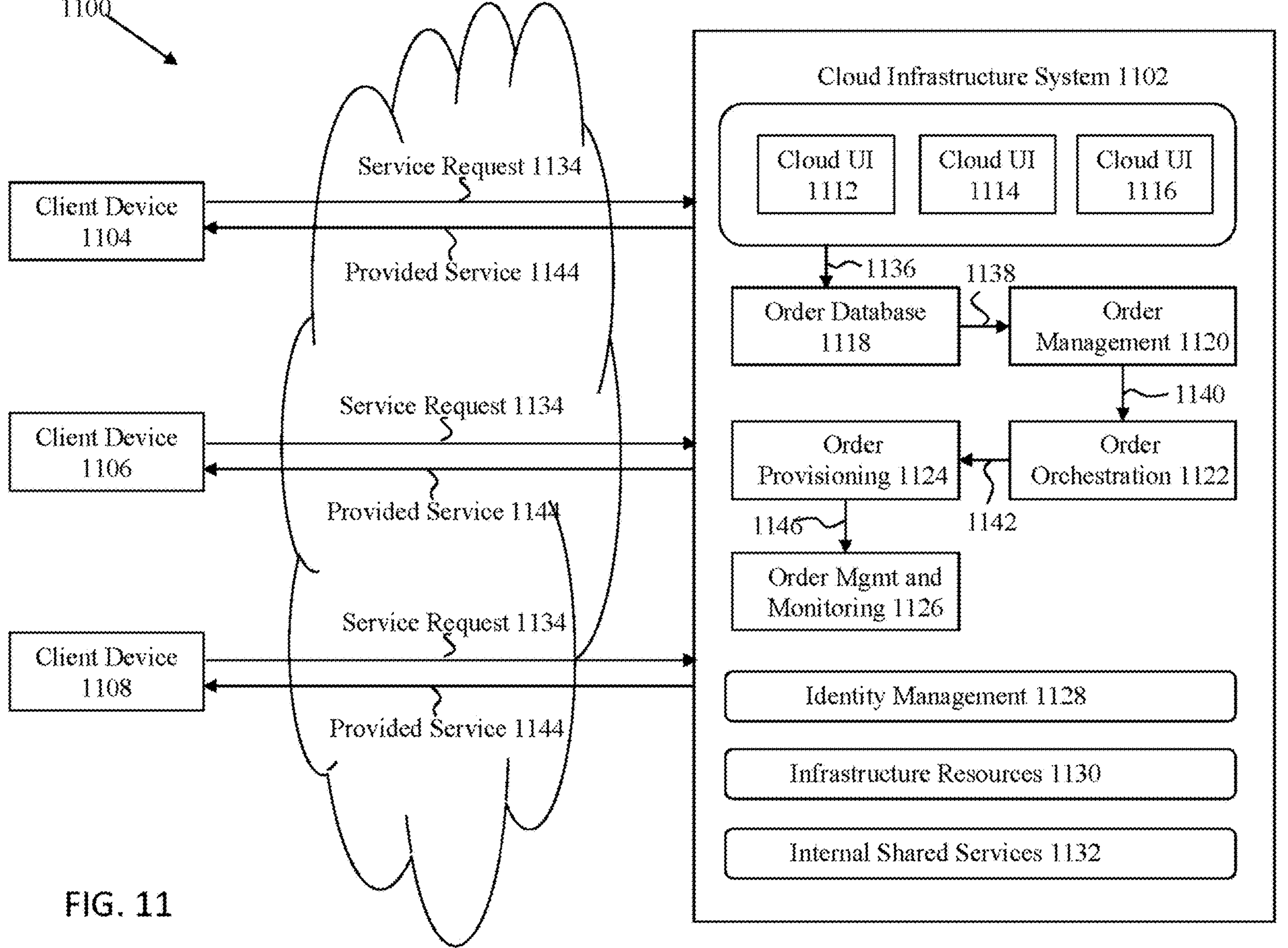
FIG. 11 illustrates a block diagram of one or more components of a system environment in which services may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application, or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above. Although system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols. Cloud infrastructure system 1102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (Saas) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116. At operation 1136, the order is stored in order database 1118. Order database 1118 can be one of several databases operated by cloud infrastructure system 1118 and operated in conjunction with other system elements. At operation 1138, the order information is forwarded to an order management module 1120. In some instances, order management module 1120 may be configured to perform billing and accounting functions related to the order, such as verifying the order, and upon verification, booking the order. At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1102 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1102 may include an identity management module 1128. Identity management module 1128 may be configured to provide identity services, such as access management and authorization services in cloud infrastructure system 1102. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:

maintaining a hierarchical metadata object structure pertaining to a hierarchical object structure of a multitenant database architecture comprising a container database for a plurality of tenants, the hierarchical metadata object structure comprising an object entry structure and an object buffer structure or array;

receiving a request from a tenant for an access to a metadata object in the hierarchical metadata object structure for one or more database objects in the container database; and in response to the request, provisioning access to at least a portion of the hierarchical metadata structure based at least in part on identifying the metadata object or a reference to the metadata object in the hierarchical metadata object structure stored in the object buffer structure or array using information in the entry object structure or array related to the request.

2. The method of claim 1, wherein the object entry structure stores therein one or more external handles, the one or more external handles respectively correspond to one or more metadata objects in the hierarchical metadata object structure in the object buffer structure or array, information in the entry object structure or array is utilized to decode an encoded portion of an external handle to identify the metadata object or the reference to the metadata object in the hierarchical metadata object structure stored in stored in the object buffer structure or array, and the multitenant database architecture further comprises a pluggable database (PDB).

3. The method of claim 2, wherein an external handle of the one or more external handles corresponds to a metadata object in the hierarchical metadata object structure and encodes an index and an internal handle that both correspond to the metadata object, wherein the index is decoded using information of the object entry structure to identify the metadata object or the reference to the metadata object in the hierarchical metadata object structure stored in the object buffer structure or array.

4. The method of claim 3, wherein the internal handle encodes therein at least one of a slot index value pertaining to the metadata object, a sequence count value pertaining to a number of modifications to one or more metadata objects in the hierarchical metadata object structure, and an access type value pertaining to accessibility of the external handle that corresponds to the metadata object.

5. The method of claim 2, wherein the object buffer structure or array stores therein a metadata object to which the access is requested or a link to a location at which the metadata object is to be accessed, and at least one of a buffer slot index value and an object entry index that corresponds to an external handle pertaining to the metadata object.

6. The method of claim 2, further comprising:

in response to the request for the access from the tenant, checking information of a client handle against corresponding information of an external handle of the one or more external handles to determine whether the client handle is still valid at a first time when the request is received; and upon a first determination that the client handle is still valid at the first time, granting the request for the access to the tenant to service the request at least by providing a pointer to a metadata object to fulfill the request.

7. The method of claim 6, further comprising:

checking information of the client handle against corresponding information of the external handle to determine whether the client handle is still valid at a second time when servicing the request is completed; and upon a second determination that the client handle is still valid at the second time, committing one or more changes in the metadata object resulting from the access, wherein the access includes a write operation to the metadata object.

8. The method of claim 7, wherein the one or more changes in the metadata object are committed using an atomic operation, and the atomic operation comprises storing at least the one or more changes in a persistent storage and updating a corresponding external handle by updating a sequence count value pertaining to a total number of modifications to metadata objects in the hierarchical metadata object structure, and updating an access type from a first access type value to a second access type value.

9. The method of claim 3, wherein the external handle is encoded with the internal handle and an entry index, and the internal handle is encoded with a slot index, and the internal handle is decoded using information of the object entry structure to determine a value of the slot index, the location of, the pointer to, or the link for the specific metadata object in the object buffer structure or array being identified based at least in part on the slot index value.

10. The method of claim 3, wherein the entry index of the external handle is provided by the requesting tenant.

11. The method of claim 3, wherein the internal handle is encoded with a slot index that corresponds to a physical or logical location of, a pointer to, or a link for a metadata object in the object buffer structure or array, and a sequence count value pertaining to a number of modifications to the metadata object in the hierarchical metadata structure.

12. The method of claim 3, wherein external handles are at least partially exposed to the requesting tenant, respective internal handles encoded within respective external handles comprise respective encoded information used to locate respective metadata objects in the object buffer structure or array, and the metadata objects in the object buffer structure or array are not directly exposed to the requesting tenant.

13. The method of claim 3, wherein respective metadata objects are stored in the object buffer structure or array according to a hierarchical structure corresponding to a hierarchical structure of an object entry structure that stores a plurality of external handles.

14. The method of claim 1, wherein provisioning access comprises provisioning lock-free access to at least the portion of the hierarchical metadata object structure.

15. A computer program product comprising a non-transitory computer usable medium having stored thereon a sequence of instructions which, when executed by a processor, causes the processor to perform a set of acts comprising:

maintaining a hierarchical metadata object structure pertaining to a hierarchical object structure of a multitenant database architecture comprising a container database for a plurality of tenants, the hierarchical metadata object structure comprising an object entry structure and an object buffer structure or array;

receiving a request from a tenant for an access to a metadata object in the hierarchical metadata object structure for one or more database objects in the container database; and in response to the request, provisioning access to at least a portion of the hierarchical metadata structure based at least in part on identifying the metadata object or a reference to the metadata object in the hierarchical metadata object structure stored in the object buffer structure or array using information in the entry object structure or array related to the request.

16. The computer program product of claim 15, wherein the object entry structure stores therein one or more external handles, the one or more external handles respectively correspond to one or more metadata objects in the hierarchical metadata object structure in the object buffer structure or array, information in the entry object structure or array is utilized to decode an encoded portion of an external handle to identify the metadata object or the reference to the metadata object in the hierarchical metadata object structure stored in the object buffer structure or array, and the multitenant database architecture further comprises a pluggable database (PDB).

17. The computer program product of claim 16, wherein an external handle of the one or more external handles corresponds to a metadata object in the hierarchical metadata object structure and encodes an index and an internal handle that both correspond to the metadata object, wherein the index is decoded using information of the object entry structure to identify the metadata object or the reference to the metadata object in the hierarchical metadata object structure stored in the object buffer structure or array.

18. The computer program product of claim 17, wherein the internal handle encodes therein at least one of a slot index value pertaining to the metadata object, a sequence count value pertaining to a number of modifications to one or more metadata objects in the hierarchical metadata object structure, and an access type value pertaining to accessibility of the external handle that corresponds to the metadata object.

19. The computer program product of claim 16, wherein the object buffer structure or array stores therein a metadata object to which the access is requested or a link to a location at which the metadata object is to be accessed, and at least one of a buffer slot index value and an object entry index that corresponds to an external handle pertaining to the metadata object.

20. The computer program product of claim 16, the set of acts further comprising:

in response to the request for the access from the tenant, checking information of a client handle against corresponding information of an external handle of the one or more external handles to determine whether the client handle is still valid at a first time when the request is received; and upon a first determination that the client handle is still valid at the first time, granting the request for the access to the tenant to service the request at least by providing a pointer to a metadata object to fulfill the request.

21. The computer program product of claim 20, the set of acts further comprising:

checking information of the client handle against corresponding information of the external handle to determine whether the client handle is still valid at a second time when servicing the request is completed; and upon a second determination that the client handle is still valid at the second time, committing one or more changes in the metadata object resulting from the access, wherein the access includes a write operation to the metadata object.

22. The computer program product of claim 21, wherein the one or more changes in the metadata object are committed using an atomic operation, and the atomic operation comprises storing at least the one or more changes in a persistent storage and updating a corresponding external handle by updating a sequence count value pertaining to a total number of modifications to metadata objects in the hierarchical metadata object structure, and updating an access type from a first access type value to a second access type value.

23. A system, comprising:

a computer processor to execute a set of program code instructions; and a memory to store the set of program code instructions which, when executed by the computer processor, causes the computer processor to perform a set of acts, the set of acts comprising:

maintaining a hierarchical metadata structure pertaining to a hierarchical object structure of a multitenant database architecture comprising a container database for a plurality of tenants, the hierarchical metadata object structure comprising an object entry structure and an object buffer structure or array receiving a request from a tenant for an access to a metadata object in the hierarchical metadata object structure for one or more database objects in the container database; and in response to the request, provisioning access to at least a portion of the hierarchical metadata structure based at least in part on identifying the metadata object or a reference to the metadata object in the hierarchical metadata object structure stored in the object buffer structure or array using information in the entry object structure or array related to the request.

24. The system of claim 23, wherein the object entry structure stores therein one or more external handles, the one or more external handles respectively correspond to one or more metadata objects in the hierarchical metadata object structure, information in the entry object structure or array is utilized to decode an encoded portion of an external handle to identify the metadata object or the reference to the metadata object in the hierarchical metadata object structure stored in stored in the object buffer structure or array, and the multitenant database architecture further comprises a pluggable database (PDB).

25. The system of claim 24, wherein an external handle of the one or more external handles corresponds to a metadata object in the hierarchical metadata object structure and encodes an index and an internal handle that both correspond to the metadata object, wherein the index is decoded using information of the object entry structure to identify the metadata object or the reference to the metadata object in the hierarchical metadata object structure stored in the object buffer structure or array.

26. The system of claim 25, wherein the internal handle encodes therein at least one of a slot index value pertaining to the metadata object, a sequence count value pertaining to a number of modifications to one or more metadata objects in the hierarchical metadata object structure, and an access type value pertaining to accessibility of the external handle that corresponds to the metadata object.

27. The system of claim 24, wherein the object buffer structure or array stores therein a metadata object to which the access is requested or a link to a location at which the metadata object is to be accessed and at least one of a buffer slot index value and an object entry index that corresponds to an external handle pertaining to the metadata object.

28. The system of claim 24, the set of acts further comprising:

in response to the request for the access from the tenant, checking information of a client handle against corresponding information of an external handle of the one or more external handles to determine whether the client handle is still valid at a first time when the request is received; and upon a first determination that the client handle is still valid at the first time, granting the request for the access to the tenant to service the request at least by providing a pointer to a metadata object to fulfill the request.

29. The system of claim 28, the set of acts further comprising:

checking information of the client handle against corresponding information of the external handle to determine whether the client handle is still valid at a second time when servicing the request is completed; and upon a second determination that the client handle is still valid at the second time, committing one or more changes in the metadata object resulting from the access, wherein the access includes a write operation to the metadata object.

30. The system of claim 29, wherein the one or more changes in the metadata object are committed using an atomic operation, and the atomic operation comprises storing at least the one or more changes in a persistent storage and updating a corresponding external handle by updating a sequence count value pertaining to a total number of modifications to metadata objects in the hierarchical metadata object structure, and updating an access type from a first access type value to a second access type value.

* * * * *